(12) United States Patent
Xie et al.

(10) Patent No.: US 12,228,705 B2
(45) Date of Patent: Feb. 18, 2025

(54) OPTICAL IMAGING SYSTEM, IMAGE CAPTURING APPARATUS AND ELECTRONIC APPARATUS

(71) Applicant: JIANGXI JINGCHAO OPTICAL CO., LTD., Nanchang (CN)

(72) Inventors: Han Xie, Nanchang (CN); Binbin Liu, Nanchang (CN); Ming Li, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 645 days.

(21) Appl. No.: 17/606,040

(22) PCT Filed: Oct. 18, 2019

(86) PCT No.: PCT/CN2019/111957
§ 371 (c)(1),
(2) Date: Oct. 24, 2021

(87) PCT Pub. No.: WO2021/072745
PCT Pub. Date: Apr. 22, 2021

(65) Prior Publication Data
US 2022/0196988 A1      Jun. 23, 2022

(51) Int. Cl.
*G02B 13/00*      (2006.01)
*G02B 9/60*       (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| 4,981,344 A | 1/1991 | Ueda |
| 6,414,800 B1 | 7/2002 | Hamano |
(Continued)

FOREIGN PATENT DOCUMENTS

| CN | 1206842 A | 2/1999 |
| CN | 1297164 A | 5/2001 |
(Continued)

OTHER PUBLICATIONS

International Search Report dated on Jan. 15, 2020 on International Patent Application PCT/CN2019/110525, filed Jan. 3, 2020, in the name of Jiangxi Jingchao Optical Co. Ltd.
(Continued)

*Primary Examiner* — Joseph P Martinez
*Assistant Examiner* — Ray Alexander Dean
(74) *Attorney, Agent, or Firm* — Franklin & Associates International Inc; Matthew F. Lambrinos

(57) ABSTRACT

An optical imaging system sequentially includes a first lens, a second lens, a third lens, a fourth lens and a fifth lens from an object side to an image side along an optical axis. The first lens has positive refractive power, with an object-side surface being convex at the optical axis; the second lens has refractive power, with an image-side surface being convex at the optical axis; the third lens has refractive power; the fourth lens has positive refractive power, with an image-side surface being convex at the optical axis; the fifth lens has negative refractive power, with an object-side surface being convex at the optical axis and an image-side surface being concave at the optical axis; a diaphragm is arranged between the object side of the optical imaging system and the fifth lens.

17 Claims, 18 Drawing Sheets

(56) References Cited

U.S. PATENT DOCUMENTS

| | | |
|---|---|---|
| 6,985,309 B2 | 1/2006 | Shinohara |
| 9,057,868 B1 | 6/2015 | Chung et al. |
| 2004/0218285 A1 | 11/2004 | Amanai |
| 2004/0264003 A1 | 12/2004 | Noda |
| 2005/0046970 A1 | 3/2005 | Amanai |
| 2008/0106801 A1 | 5/2008 | Kang et al. |
| 2010/0254029 A1 | 10/2010 | Shinohara |
| 2012/0075718 A1 | 3/2012 | Seo |
| 2014/0063620 A1 | 3/2014 | Jung et al. |
| 2015/0138425 A1 | 5/2015 | Lee et al. |
| 2016/0124192 A1 | 5/2016 | Koreeda |
| 2016/0161709 A1 | 6/2016 | Hsueh et al. |
| 2017/0307858 A1 | 10/2017 | Chen |
| 2018/0113282 A1 | 4/2018 | Tsai |
| 2020/0073092 A1 | 3/2020 | Chen |

FOREIGN PATENT DOCUMENTS

| | | | | |
|---|---|---|---|---|
| CN | 101093274 A | 12/2007 | | |
| CN | 101983348 A | 3/2011 | | |
| CN | 102132189 A | 7/2011 | | |
| CN | 102419470 A | 4/2012 | | |
| CN | 102466864 A | 5/2012 | | |
| CN | 202522758 U | 11/2012 | | |
| CN | 102914851 A | 2/2013 | | |
| CN | 102985865 A | 3/2013 | | |
| CN | 102998774 A | 3/2013 | | |
| CN | 103676088 A | 3/2014 | | |
| CN | 103852858 A | 6/2014 | | |
| CN | 103969804 A | 8/2014 | | |
| CN | 104570277 A | 4/2015 | | |
| CN | 104570295 A | 4/2015 | | |
| CN | 104914558 A | 9/2015 | | |
| CN | 104932086 A | 9/2015 | | |
| CN | 204631345 U | 9/2015 | | |
| CN | 105259636 A | 1/2016 | | |
| CN | 105372793 A | 3/2016 | | |
| CN | 105607232 A | 5/2016 | | |
| CN | 105607233 A | 5/2016 | | |
| CN | 205210492 U | 5/2016 | | |
| CN | 205210493 U | 5/2016 | | |
| CN | 105988185 A | * 10/2016 | ......... | G02B 13/0045 |
| CN | 105988186 A | 10/2016 | | |
| CN | 106033141 A | 10/2016 | | |
| CN | 106154496 A | 11/2016 | | |
| CN | 106338815 A | 1/2017 | | |
| CN | 106526796 A | 3/2017 | | |
| CN | 106610518 A | 5/2017 | | |
| CN | 106646825 A | 5/2017 | | |
| CN | 106772931 A | 5/2017 | | |
| CN | 106773008 A | 5/2017 | | |
| CN | 106802469 A | 6/2017 | | |
| CN | 106842512 A | 6/2017 | | |
| CN | 106842514 A | 6/2017 | | |
| CN | 106896474 A | 6/2017 | | |
| CN | 106959500 A | 7/2017 | | |
| CN | 106970464 A | 7/2017 | | |
| CN | 107024756 A | 8/2017 | | |
| CN | 107102425 A | 8/2017 | | |
| CN | 107167897 A | 9/2017 | | |
| CN | 107167902 A | 9/2017 | | |
| CN | 206460205 U | 9/2017 | | |
| CN | 107290843 A | 10/2017 | | |
| CN | 105589179 B | * 1/2018 | ......... | G02B 13/0045 |
| CN | 206946078 U | 1/2018 | | |
| CN | 107703609 A | 2/2018 | | |
| CN | 107831588 A | 3/2018 | | |
| CN | 207164341 U | 3/2018 | | |
| CN | 107976770 A | 5/2018 | | |
| CN | 108089278 A | 5/2018 | | |
| CN | 108089317 A | 5/2018 | | |
| CN | 207424362 U | 5/2018 | | |
| CN | 207424363 U | 5/2018 | | |
| CN | 108107548 A | 6/2018 | | |
| CN | 108227146 A | 6/2018 | | |
| CN | 207557562 U | 6/2018 | | |
| CN | 108459394 A | 8/2018 | | |
| CN | 108761745 A | 11/2018 | | |
| CN | 108873250 A | 11/2018 | | |
| CN | 109283665 A | 1/2019 | | |
| CN | 109375346 A | 2/2019 | | |
| CN | 208506348 U | 2/2019 | | |
| CN | 109407267 A | 3/2019 | | |
| CN | 109725406 A | 5/2019 | | |
| CN | 109752823 A | 5/2019 | | |
| CN | 109814235 A | 5/2019 | | |
| CN | 208833988 U | 5/2019 | | |
| CN | 208872939 U | 5/2019 | | |
| CN | 208888449 U | 5/2019 | | |
| CN | 109870786 A | 6/2019 | | |
| CN | 109870788 A | 6/2019 | | |
| CN | 109917533 A | 6/2019 | | |
| CN | 110018556 A | 7/2019 | | |
| CN | 209070186 U | 7/2019 | | |
| CN | 110109226 A | 8/2019 | | |
| CN | 110208927 A | 9/2019 | | |
| CN | 110261997 A | 9/2019 | | |
| CN | 110398815 A | 11/2019 | | |
| CN | 110426822 A | 11/2019 | | |
| CN | 110531500 A | 12/2019 | | |
| CN | 110568583 A | 12/2019 | | |
| CN | 110618522 A | 12/2019 | | |
| CN | 209765129 U | 12/2019 | | |
| CN | 110646919 A | 1/2020 | | |
| CN | 110646921 A | 1/2020 | | |
| CN | 110794555 A | 2/2020 | | |
| CN | 110879454 A | 3/2020 | | |
| CN | 111007649 A | 4/2020 | | |
| CN | 111025600 A | 4/2020 | | |
| CN | 111308688 A | 6/2020 | | |
| CN | 111338057 A | 6/2020 | | |
| CN | 210720853 U | 6/2020 | | |
| CN | 111399186 A | 7/2020 | | |
| CN | 211786331 U | 10/2020 | | |
| JP | 2008268977 A | 11/2008 | | |
| JP | 2013235242 A | 11/2013 | | |
| KR | 1020140135909 A | 11/2014 | | |
| TW | 201350956 A | 12/2013 | | |
| TW | I625567 B | 6/2018 | | |
| TW | I640811 B | 11/2018 | | |
| TW | I655474 B | 4/2019 | | |
| WO | 2003046633 A2 | 6/2003 | | |
| WO | 2014162779 A1 | 10/2014 | | |
| WO | 2015159721 A1 | 10/2015 | | |
| WO | 2017180362 A1 | 10/2017 | | |
| WO | 2020220444 A1 | 11/2020 | | |
| WO | 2020258269 A1 | 12/2020 | | |
| WO | 2021026869 A1 | 2/2021 | | |
| WO | 2021087661 A1 | 5/2021 | | |
| WO | 2021087669 A1 | 5/2021 | | |
| WO | 2021102943 A1 | 6/2021 | | |
| WO | 2021103797 A1 | 6/2021 | | |
| WO | 2021109127 A1 | 6/2021 | | |
| WO | 2021138754 A1 | 7/2021 | | |
| WO | 2021179207 A1 | 9/2021 | | |
| WO | 2021184164 A1 | 9/2021 | | |
| WO | 2021184165 A1 | 9/2021 | | |
| WO | 2021184167 A1 | 9/2021 | | |
| WO | 2021203277 A1 | 10/2021 | | |
| WO | 2021217504 A1 | 11/2021 | | |
| WO | 2021217664 A1 | 11/2021 | | |

OTHER PUBLICATIONS

U.S. Appl. No. 17/284,467, 371 filed Apr. 11, 2021, in the name of Jiangxi Jingchao Optical Co. Ltd.

International Search Report on International Patent Application PCT/CN2019/100747, filed Aug. 8, 2019, in the name of Jiangxi Jingchao Optical Co. Ltd.

U.S. Appl. No. 17/601,075, 371 filed Oct. 3, 2021, in the name of Jiangxi Jingchao Optical Co. Ltd.

U.S. Appl. No. 17/440,786, 371 filed Sep. 19, 2021, in the name of Jiangxi Jingchao Optical Co. Ltd.

(56) References Cited

OTHER PUBLICATIONS

U.S. Appl. No. 17/605,985, 371 filed Oct. 22, 2021, in the name of OFilm Group Co. Ltd. and Jiangxi Jingchao Optical Co. Ltd.
U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed date Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.

* cited by examiner

OPTICAL IMAGING SYSTEM, IMAGE CAPTURING APPARATUS AND ELECTRONIC APPARATUS

CROSS-REFERENCE TO RELATED APPLICATION

This application is a national stage, filed under 35 U.S.C. § 371, of International Patent Application No. PCT/CN2019/111957, entitled "OPTICAL IMAGING SYSTEM, IMAGE CAPTURING APPARATUS AND ELECTRONIC APPARATUS", filed on Oct. 18, 2019, the contents of which are incorporated by reference herein in its entirety.

TECHNICAL FIELD

The present disclosure relates to the field of optical imaging technologies, more particularly, to an optical imaging system, an image capturing apparatus and an electronic apparatus.

BACKGROUND

In recent years, with the development of science and technology, portable electronic products with a photographing function become increasingly more popular. A wide-angle lens has a larger photographing field of view, which can photograph large scenes or panoramic photos within a limited range, so as to better meet users' demands.

However, with the development of a CMOS chip technology, a pixel size of a chip is increasingly smaller, and the imaging quality of a matching optical imaging system is required to be increasingly better. In order to ensure the imaging quality, a conventional wide-angle lens usually has a larger lens head while a viewing angle range is expanded, which is difficult to meet the application requirements of slim and miniaturized electronic products.

SUMMARY

According to various embodiments of the present disclosure, an optical imaging system is provided.

An optical imaging system, including a first lens, a second lens, a third lens, a fourth lens and a fifth lens in sequence from an object side to an image side along an optical axis, wherein
  the first lens has positive focal power, with an object-side surface being convex at the optical axis;
  the second lens has focal power, with an image-side surface being convex at the optical axis;
  the third lens has focal power;
  the fourth lens has positive focal power, with an image-side surface being convex at the optical axis;
  the fifth lens has negative focal power, with an object-side surface being convex at the optical axis and an image-side surface being concave at the optical axis, at least one of the object-side surface and the image-side surface of the fifth lens including at least one inflection point;
  a diaphragm is arranged between the object side of the optical imaging system and the fifth lens; and
  the optical imaging system satisfies the following relations:

$SD11/SD12<1.1;$ $80°≤FOV≤120°;$ where SD11 is a maximum effective semi-diameter of the object-side surface of the first lens, SD12 is a maximum effective semi-diameter of an image-side surface of the first lens, and FOV is a maximum field-of-view angle of the optical imaging system.

An image capturing apparatus, including the optical imaging system according to the above embodiment; and a photosensitive element, the photosensitive element being arranged on the image side of the optical imaging system.

An electronic apparatus, including: a housing; and the image capturing apparatus according to the above embodiment, the image capturing apparatus being mounted to the housing.

Details of one or more embodiments of the present disclosure are set forth in the following accompanying drawings and descriptions. Other features, objectives and advantages of the present disclosure become obvious with reference to the specification, the accompanying drawings, and the claims.

BRIEF DESCRIPTION OF THE DRAWINGS

In order to better describe and illustrate embodiments or examples of those inventions disclosed herein, reference may be made to one or more accompanying drawings. Additional details or examples used to describe the accompanying drawings should not be considered as limitations on the scope of any of the disclosed inventions, the presently described embodiments or examples, and the presently understood best mode of these inventions.

DETAILED DESCRIPTION OF THE EMBODIMENTS

Figure 1:
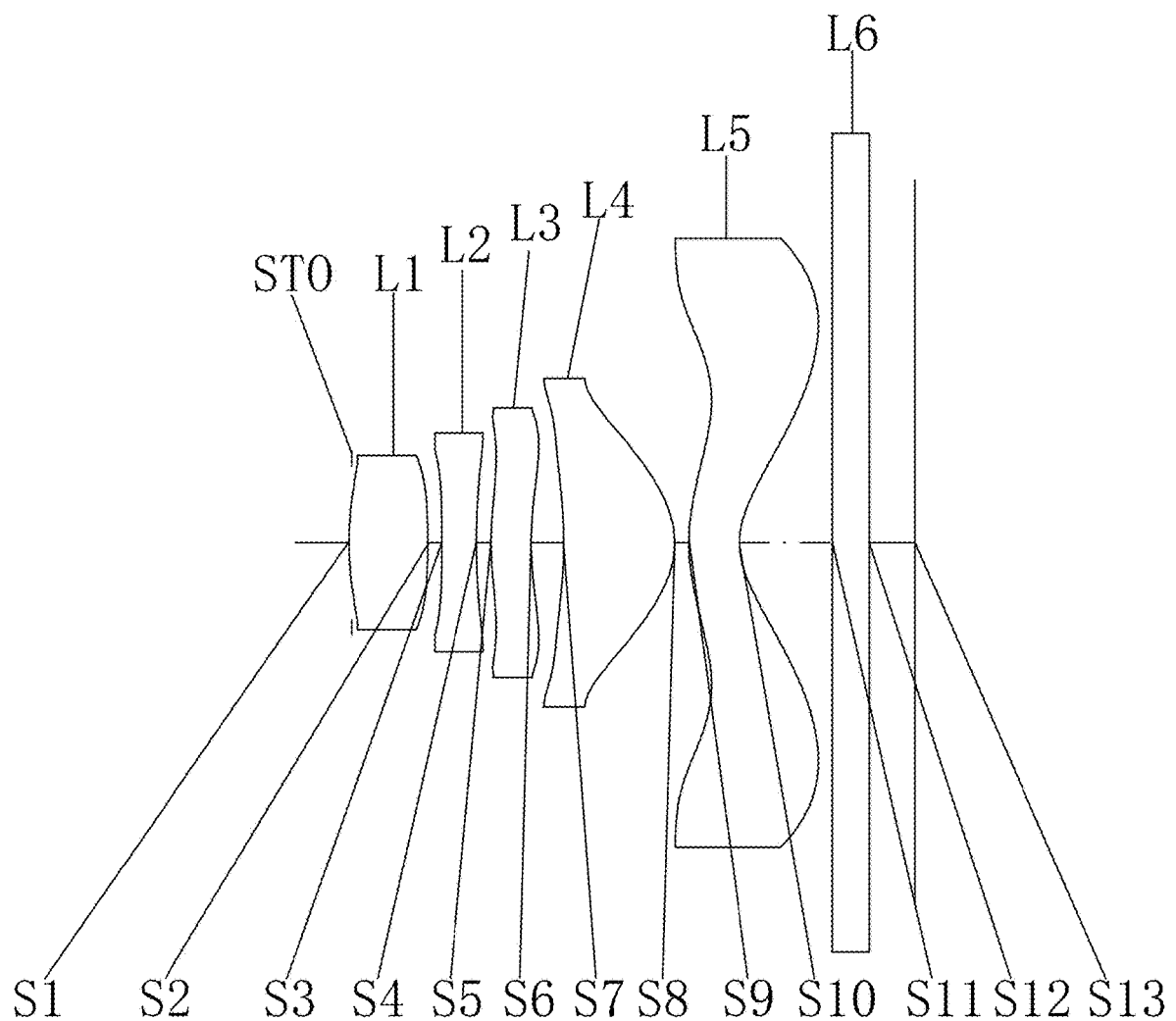
FIG. 1 is a schematic structural diagram of an optical imaging system according to Embodiment 1 of the present disclosure.

To facilitate the understanding of the present disclosure, a more comprehensive description of the present disclosure is given below with reference to the accompanying drawings. Preferred embodiments of the present disclosure are given in the accompanying drawings. However, the present disclosure may be implemented in many different forms and is not limited to the embodiments described herein. On the contrary, these embodiments are provided to understand the disclosed content of the present disclosure more thoroughly and comprehensively.

It should be noted that when one element is referred to as "fixed to" another element, it may be directly on the other element or an intermediate element may exist. When one element is considered to be "connected to" another element, it may be directly connected to another element or an intermediate element may co-exist. The terms "vertical", "horizontal", "left", "right", "upper", "lower", "front", "back" and "circumferential" and similar expressions are based on the orientation or position relationship shown in the accompanying drawings and are intended to facilitate the description of the present disclosure and simplify the description only, rather than indicating or implying that the apparatus or element referred to must have a particular orientation or be constructed and operated in a particular orientation, and therefore will not to be interpreted as limiting the present disclosure.

It should be noted that in the specification, expressions such as first, second and third are used only to distinguish one feature from another feature, and do not imply any limitation on features. Therefore, a first lens discussed below may also be referred to as a second lens or third lens without departing from the teaching of the present disclosure.

For ease of description, spherical or aspheric shapes shown in the accompanying drawings are illustrated with examples. That is, spherical or aspheric shapes are not limited to the spherical or aspheric shapes shown in the accompanying drawings. The accompanying drawings are merely examples, not strictly drawn to scale.

Unless defined otherwise, all technical and scientific terms used herein have the same meanings as are commonly understood by those skilled in the art. The terms used herein in the specification of the present disclosure are for the purpose of describing specific embodiments only but not intended to limit the present disclosure. The term "and/or" used herein includes any and all combinations of one or more related listed items.

In order to ensure a wide viewing angle and the imaging quality of the conventional wide-angle lens, a diameter of a first lens is usually relatively large, which is difficult to meet the application requirements of slim electronic products. In addition, an edge shape of the first lens of the conventional wide-angle lens is also more curved, so the mass production forming process of the lens is not high.

The defects in the above solutions are results obtained by the inventor after practice and careful study. Therefore, the discovery process of the above problems and the solutions to the above problems proposed below in embodiments of the present disclosure all should be contributions of the inventor to the present disclosure.

Features, principles and other aspects of the present disclosure are described in detail below.

Referring to FIG. 1, FIG. 3, FIG. 5, FIG. 7, FIG. 9 and FIG. 11 together, an optical imaging system according to embodiments of the present disclosure includes five lenses with focal power, that is, a first lens, a second lens, a third lens, a fourth lens and a fifth lens. The five lenses are arranged in sequence from an object side to an image side along an optical axis.

The first lens has positive focal power, with an object-side surface being convex at the optical axis; the second lens has focal power, with an image-side surface being convex at the optical axis; the third lens has focal power; the fourth lens has positive focal power, with an image-side surface being convex at the optical axis; and the fifth lens has negative focal power, with an object-side surface being convex at the optical axis and an image-side surface being concave at the optical axis, at least one of the object-side surface and the image-side surface of the fifth lens including at least one inflection point. The inflection point is provided, so that an angle at which light from an off-axis field of view is incident onto a photosensitive element can be effectively suppressed, and the aberration of the off-axis field of view can be further corrected at the same time, so as to improve the imaging quality.

A diaphragm is arranged between the object side of the optical imaging system and the fifth lens, so as to further enhance the imaging quality of the optical imaging system. The diaphragm may be an aperture diaphragm or a field diaphragm.

Specifically, the optical imaging system satisfies the following relation: $SD11/SD12<1.1$; where SD11 is a maximum effective semi-diameter of the object-side surface of the first lens, and SD12 is a maximum effective semi-diameter of an image-side surface of the first lens. SD11/SD12 may be 0.90, 0.93, 0.95, 0.98, 1.01, 1.04 or 1.07. The maximum effective semi-diameter of the object-side surface of the first lens and the maximum effective semi-diameter of the image-side surface of the first lens are controlled to satisfy the above relation, so that a size difference between diameters of the object-side surface and the image-side surface of the first lens can be reduced, which ensures that a diameter of the object-side surface of the first lens may not be too large and reduces the sensitivity of the optical imaging system. More importantly, the ratio of SD11 to SD12 is controlled within the above range, so that the diameter of the object-side surface of the first lens is better limited, thereby enabling a diameter of a head of a lens with the optical imaging system to be smaller, to realize miniaturization of a lens module.

Specifically, the optical imaging system further satisfies the following relation: $80°≤FOV≤120°$; where FOV is a maximum field-of-view angle of the optical imaging system. FOV may be 80°, 83°, 87°, 90°, 93°, 96°, 99° or 100°. The maximum field-of-view angle of the optical imaging system is controlled to satisfy the above relation, so that it is conducive to expanding a photographing range of the lens and increasing photographing scenes, so as to enable users to obtain a better photographing experience. Preferably, the maximum field-of-view angle of the optical imaging system satisfies $80°≤FOV≤100°$, so that distortion around an image can be reduced effectively.

When the optical imaging system is applied to imaging, light emitted from or reflected by a subject enters the optical imaging system from an object-side direction, sequentially passes through the first lens, the second lens, the third lens, the fourth lens and the fifth lens, and is finally focused on an imaging surface.

According to the optical imaging system, the diameter, curvature and shape of the first lens are optimized while a large field-of-view angle is ensured, and the diameter of the first lens is reduced, so that the optical imaging system has a smaller head size and better processing performance, which can better meet the application requirements of slim electronic devices. At the same time, the aberration of the optical imaging system can be reduced by reasonably allocating the focal power and surface shapes of the lenses as well as pitches among the lenses, so as to ensure the imaging quality of the optical imaging system.

In an exemplary implementation, the diaphragm is arranged between the object side of the optical imaging system and the first lens. An excessive increase in a chief ray angle can be effectively inhibited by arranging the diaphragm in front, so that the optical imaging system can be better matched with a photosensitive chip of a conventional specification.

In an exemplary implementation, an angle between a tangent line of a vertex of a maximum effective diameter of the object-side surface of the first lens and a normal of the optical axis is θ, and the optical imaging system satisfies the following relation: |θ|<20°. |θ| may be 0.3°, 3.3°, 6.3°, 9.3°, 12.3°, 15.3°, 16.3° or 19.8°. The angle between the tangent line of the vertex of the maximum effective diameter of the object-side surface of the first lens and the normal of the optical axis is reduced, so that the processing of the first lens is easy while a wide angle of the optical imaging system is ensured, which is conducive to the assembly and mass production of the lens.

In an exemplary implementation, a maximum effective semi-diameter of the object-side surface of the first lens is SD11, a maximum effective semi-diameter of the image-side surface of the fifth lens is SD52, and the optical imaging system satisfies the following relation: SD11/SD52<0.4. SD11/SD52 may be 0.24, 0.26, 0.28, 0.30, 0.32, 0.34, 0.36 or 0.38. The size of the diameter of the object-side surface of the first lens is optimized, which is conducive to miniaturizing the optical imaging system and designing a small head of the lens.

In an exemplary implementation, a maximum effective semi-diameter of the object-side surface of the first lens is SD11, half of a diagonal length of an effective pixel region on the imaging surface of the optical imaging system is ImgH, and the optical imaging system satisfies the following relation: SD11/ImgH≤0.27. SD11/ImgH may be 0.20, 0.21, 0.22, 0.23, 0.24, 0.25, 0.26 or 0.27. The maximum effective semi-diameter of the object-side surface of the first lens and the half of the diagonal length of the effective pixel region on the imaging surface of the optical imaging system are controlled to satisfy the above relation, so that the lens has a smaller head diameter when matched with a photosensitive chip of the same size, which is conducive to the miniaturization of the lens and better meets the application requirements of slim electronic devices.

In an exemplary implementation, a curvature radius of the object-side surface of the first lens at the optical axis is R1, an effective focal length of the first lens is f1, and the optical imaging system satisfies the following relation: 0.3<R1/f1<0.8. R1/f1 may be 0.31, 0.36, 0.41, 0.46, 0.51, 0.56, 0.61, 0.66, 0.71, 0.76 or 0.78. The curvature radius of the object-side surface of the first lens at the optical axis and the effective focal length of the first lens are controlled to satisfy the above relation, so that the first lens can be configured with enough positive focal power to help the light to be better incident into the optical imaging system. At the same time, good imaging quality is ensured while the total length of the optical imaging system is reduced to realize miniaturization.

In an exemplary implementation, an effective focal length of the fifth lens is f5, an effective focal length of the optical imaging system is f, and the optical imaging system satisfies the following relation: f5/f<−0.5. f5/f may be −0.95, −0.90, −0.85, −0.80, −0.75, −0.70, −0.65, −0.60 or −0.55. The effective focal length of the fifth lens and the effective focal length of the optical imaging system are controlled to satisfy the above relation, which is conducive to correcting the aberration and field curvature of the optical imaging system, thereby enabling the system to maintain better optical performance.

In an exemplary implementation, half of a diagonal length of an effective pixel region on the imaging surface of the optical imaging system is ImgH, a distance on the optical axis from the object-side surface of the first lens to the imaging surface of the optical imaging system is TTL, and the optical imaging system satisfies the following relation: ImgH/TTL≥0.6. ImgH/TTL may be 0.60, 0.61, 0.62, 0.63, 0.64, 0.65, 0.66, 0.67, 0.68, 0.69, 0.70, 0.71 or 0.72. The half of a diagonal length of an effective pixel region on the imaging surface of the optical imaging system and the distance on the optical axis from the object-side surface of the first lens to the imaging surface of the optical imaging system are controlled to satisfy the above relation, which is conducive to compressing the total length of the optical imaging system and realizing the miniaturization of the lens.

In an exemplary implementation, a curvature radius of an object-side surface of the third lens at the optical axis is R5, a curvature radius of an image-side surface of the third lens at the optical axis is R6, and the optical imaging system satisfies the following relation: −1<R5/R6<1.4. R5/R6 may be −0.15, 0.05, 0.25, 0.45, 0.65, 0.85, 1.05, 1.25, 1.35 or 1.36. The third lens has positive or negative focal power. The curvature radii of the object-side surface and the image-side surface of the third lens are optimized, which is conducive to reducing the aberration of the optical imaging system and improving the analytical capability of the lens.

In an exemplary implementation, a dispersion coefficient of the first lens is V1, a dispersion coefficient of the second lens is V2, and the optical imaging system satisfies the following relation: 0.3<V2/V1≤1. V2/V1 may be 0.32, 0.37, 0.42, 0.47, 0.52, 0.57, 0.62, 0.67, 0.72, 0.77, 0.82, 0.87, 0.92, 0.97 or 1.0. The dispersion coefficient of the first lens and the dispersion coefficient of the second lens are controlled to satisfy the above relation, so that it is conducive to reducing the chromatic aberration of the system and improving the imaging quality of the optical imaging system.

In an exemplary implementation, a thickness of the first lens on the optical axis is CT1, a distance on the optical axis from the object-side surface of the first lens to the image-side surface of the fifth lens is OAL, and the optical imaging system satisfies the following relation: CT1/OAL<0.21. CT1/OAL may be 0.11, 0.12, 0.13, 0.14, 0.15, 0.16, 0.17, 0.18, 0.19 or 0.20. The thickness of the first lens on the optical axis and the distance on the optical axis from the object-side surface of the first lens to the image-side surface of the fifth lens are controlled to satisfy the above relation, so that the thickness of the first lens on the optical axis may not be too large, which is conducive to reducing the total length of the optical imaging system and meeting the application requirements of slim electronic devices.

In an exemplary implementation, a maximum field-of-view angle of the optical imaging system is FOV, an entrance pupil diameter of the optical imaging system is EPD, and the optical imaging system satisfies the following relation: $0.7 \leq \tan(FOV/2)/EPD < 1.6$; $\tan(FOV/2)/EPD$ may be 0.70, 0.80, 0.90, 1.0, 1.1, 1.2, 1.3, 1.4, 1.5 or 1.55. The maximum field-of-view angle of the optical imaging system and the entrance pupil diameter of the optical imaging system are controlled to satisfy the above relation, which can be effectively increase the field-of-view angle of the optical imaging system, so as to better meet the users' usage experience.

In an exemplary implementation, lens surfaces of the first lens to the fifth lens are all aspheric surfaces. The lens surfaces of the lenses are set to aspheric surfaces, so that it is conducive to correcting the aberration of the optical imaging system and improving the resolution of an image produced by the optical imaging system.

In an exemplary implementation, the optical imaging system further includes a filter configured to filter out infrared light and/or protection glass configured to protect a photosensitive element, wherein the photosensitive element is located on the imaging surface.

The optical imaging system according to the above implementation of the present disclosure may include a plurality of lenses, for example, five lenses as described above. The diameter, curvature and shape of the first lens are optimized, and focal lengths, focal power, surface shapes, and thicknesses of the lenses and on-axis pitches among the lenses are reasonably allocated, so that an optical imaging system with a smaller head diameter is provided while a large field-of-view angle and good imaging quality are ensured, so as to better meet the application requirements of slim electronic devices. It may be understood that the optical imaging system is not limited to including five lenses, although an example of five lenses is described in the implementation. The optical imaging system may also include other numbers of lenses if necessary.

Specific embodiments of the optical imaging system applicable to the above implementation are further described below with reference to the accompanying drawings.

Embodiment 1

An optical imaging system according to Embodiment 1 of the present disclosure is described below with reference to FIG. 1 to FIG. 2C.

FIG. 1 is a schematic structural diagram of an optical imaging system according to Embodiment 1 of the present disclosure. As shown in FIG. 1, the optical imaging system includes a first lens L1, a second lens L2, a third lens L3, a fourth lens L4, a fifth lens L5 and an imaging surface S13 in sequence from an object side to an image side along an optical axis.

The first lens L1 has positive focal power, with an object-side surface S1 and an image-side surface S2 both being aspheric. The object-side surface S1 is convex at the optical axis and convex at the circumference, and the image-side surface S2 is convex at the optical axis and convex at the circumference.

The second lens L2 has negative focal power, with an object-side surface S3 and an image-side surface S4 both being aspheric. The object-side surface S3 is concave at the optical axis and concave at the circumference, and the image-side surface S4 is concave at the optical axis and convex at the circumference.

The third lens L3 has negative focal power, with an object-side surface S5 and an image-side surface S6 both being aspheric. The object-side surface S5 is convex at the optical axis and concave at the circumference, and the image-side surface S6 is concave at the optical axis and convex at the circumference.

The fourth lens L4 has positive focal power, with an object-side surface S7 and an image-side surface S8 both being aspheric. The object-side surface S7 is concave at the optical axis and concave at the circumference, and the image-side surface S8 is convex at the optical axis and convex at the circumference.

The fifth lens L5 has negative focal power, with an object-side surface S9 and an image-side surface S10 both being aspheric. The object-side surface S9 is convex at the optical axis and concave at the circumference, and the image-side surface S10 is concave at the optical axis and convex at the circumference.

A diaphragm is further arranged between an object OBJ and the first lens L1, to further improve the imaging quality of the optical imaging system.

The optical imaging system further includes a filter L6 with an object-side surface S11 and an image-side surface S12. Light from the object OBJ sequentially passes through the surfaces S1 to S12 and is finally imaged on the imaging surface S13. Optionally, the filter L6 is an infrared filter, configured to filter out infrared light in external light incident into the optical imaging system to avoid imaging distortion.

Table 1 shows surface types, curvature radii, thicknesses, materials, refractive indexes, Abbe numbers (i.e., dispersion coefficients) and effective focal lengths of the lenses of the optical imaging system according to Embodiment 1. The distance on the optical axis from the object-side surface of the first lens to the imaging surface of the optical imaging system, the curvature radii, the thicknesses and the effective focal lengths of the lenses are all in millimeters (mm). A reference wavelength is 555 nm.

TABLE 1

Embodiment 1
f = 1.948 mm, FNO = 1.985, FOV = 100°, TTL = 3.219 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.017 | | | | |
| S1 | First lens | Aspheric | 2.197 | 0.447 | Plastic | 1.544 | 56.114 | 2.846 |
| S2 | | Aspheric | −4.927 | 0.080 | | | | |
| S3 | Second lens | Aspheric | −7.864 | 0.200 | Plastic | 1.660 | 20.370 | −5.685 |
| S4 | | Aspheric | 7.386 | 0.083 | | | | |

TABLE 1-continued

Embodiment 1
f = 1.948 mm, FNO = 1.985, FOV = 100°, TTL = 3.219 mm

| Surface number | Surface name | Surface type | Curvature radius | Thickness | Material | Refractive index | Abbe number | Focal length |
|---|---|---|---|---|---|---|---|---|
| S5 | Third lens | Aspheric | 2.267 | 0.226 | Plastic | 1.544 | 56.114 | −35.239 |
| S6 | | Aspheric | 1.956 | 0.184 | | | | |
| S7 | Fourth lens | Aspheric | −4.531 | 0.631 | Plastic | 1.544 | 56.114 | 1.253 |
| S8 | | Aspheric | −0.624 | 0.080 | | | | |
| S9 | Fifth lens | Aspheric | 1.262 | 0.290 | Plastic | 1.534 | 55.770 | −1.905 |
| S10 | | Aspheric | 0.520 | 0.528 | | | | |
| S11 | Infrared filter | Spherical | Infinity | 0.210 | Glass | 1.517 | 64.167 | |
| S12 | | Spherical | Infinity | 0.259 | | | | |
| S13 | Imaging surface | Spherical | Infinity | 0.000 | | | | |

It can be known from Table 1 that in this embodiment, the first lens L1 to the fifth lens L5 are all plastic aspheric lenses. Each aspheric surface type is defined by the following formula:

$$x = \frac{ch^2}{1 + \sqrt{1 - (k+1)c^2h^2}} + \Sigma A_i h^i \quad (1)$$

where x is a vector height of a distance from a vertex of an aspheric surface when the aspheric surface is at a position of a height h along the optical axis; c is paraxial curvature of the aspheric surface, c=1/R (i.e., the paraxial curvature c is the reciprocal of the curvature radius R in Table 1); k is a conic coefficient; and Ai is an aspheric coefficient of the $i^{th}$ order. Table 2 below gives higher-order-term coefficients A4, A6, A8, A10, A12, A14, A16, A18 and A20 applicable to the aspheric surfaces S1 to S10 of the lenses in Embodiment 1.

TABLE 2

Embodiment 1
Aspheric coefficient

| Surface number | S1 | S2 | S3 | S4 | S5 |
|---|---|---|---|---|---|
| K | −4.0019E+00 | 5.3187E+01 | 9.2120E+01 | −7.2163E+01 | −1.7504E+01 |
| A4 | −1.0755E−01 | −4.3098E−02 | 3.6573E−01 | 3.5820E−01 | −3.8854E−01 |
| A6 | 9.8952E−01 | −3.1054E+00 | −4.4967E+00 | −2.4448E+00 | 1.4740E+00 |
| A8 | −1.6130E+01 | 3.0318E+01 | 3.0443E+01 | 1.4790E+01 | −1.6931E+01 |
| A10 | 1.3306E+02 | −2.3501E+02 | −1.6552E+02 | −6.2432E+01 | 1.0949E+02 |
| A12 | −7.2235E+02 | 1.1585E+03 | 5.4609E+02 | 1.5640E+02 | −4.0712E+02 |
| A14 | 2.7047E+03 | −3.4629E+03 | −9.4465E+02 | −2.2057E+02 | 9.3018E+02 |
| A16 | −7.1488E+03 | 6.1774E+03 | 5.9705E+02 | 1.4388E+02 | −1.3018E+03 |
| A18 | 1.1871E+04 | −6.0871E+03 | 3.6210E+02 | −5.2597E+00 | 1.0232E+03 |
| A20 | −8.8572E+03 | 2.5567E+03 | −4.9350E+02 | −2.5598E+01 | −3.4334E+02 |

| Surface number | S6 | S7 | S8 | S9 | S10 |
|---|---|---|---|---|---|
| K | −6.1018E+00 | −9.6269E+01 | −1.5990E+00 | −2.6401E+01 | −3.6601E+00 |
| A4 | −7.6497E−01 | −5.3629E−01 | 1.1523E−01 | 2.6785E−01 | −2.9663E−02 |
| A6 | 5.2712E+00 | 2.7550E+00 | 4.1741E−02 | −6.7815E−01 | −9.2031E−02 |
| A8 | −3.1073E+01 | −5.0066E+00 | −9.5469E−01 | 6.3326E−01 | 8.8280E−02 |
| A10 | 1.1841E+02 | −2.3779E+00 | 2.5774E+00 | −3.6642E−01 | −4.1390E−02 |
| A12 | −3.0049E+02 | 2.8393E+01 | −3.4737E+00 | 1.4436E−01 | 1.1106E−02 |
| A14 | 5.0492E+02 | −5.7739E+01 | 3.0819E+00 | −3.7748E−02 | −1.7863E−03 |
| A16 | −5.4048E+02 | 5.7536E+01 | −1.7517E+00 | 6.1356E−03 | 1.7068E−04 |
| A18 | 3.3216E+02 | −2.8872E+01 | 5.4813E−01 | −5.5437E−04 | −8.9387E−06 |
| A20 | −8.8176E+01 | 5.8064E+00 | −7.0079E−02 | 2.1135E−05 | 1.9757E−07 |

In this embodiment, half of a diagonal length of an effective pixel region on the imaging surface S13 of the optical imaging system, i.e., ImgH, is 2.297 mm. Therefore, it can be known from the data in Table 1 and Table 2 that the optical imaging system in Embodiment 1 satisfies:

SD11/SD12=0.9, where SD11 is a maximum effective semi-diameter of the object-side surface S1 of the first lens L1, and SD12 is a maximum effective semi-diameter of the image-side surface S2 of the first lens L1;

FOV=100°, where FOV is a maximum field-of-view angle of the optical imaging system;

|θ|=7.2°, where θ is an angle between a tangent line of a vertex of a maximum effective diameter of the object-side surface S1 of the first lens L1 and a normal of the optical axis;

SD11/SD52=0.26, where SD11 is a maximum effective semi-diameter of the object-side surface S1 of the first lens L1, and SD52 is a maximum effective semi-diameter of the image-side surface S10 of the fifth lens L5;

SD11/ImgH=0.22, where SD11 is a maximum effective semi-diameter of the object-side surface S1 of the first lens L1, and ImgH is half of a diagonal length of an effective pixel region on the imaging surface S13 of the optical imaging system;

R1/f1=0.77, where R1 is a curvature radius of the object-side surface S1 of the first lens L1 at the optical axis, and f1 is an effective focal length of the first lens L1;

f5/f=−0.98, where f5 is an effective focal length of the fifth lens L5, and f is an effective focal length of the optical imaging system;

ImgH/TTL=0.71, where ImgH is half of a diagonal length of an effective pixel region on the imaging surface S13 of the optical imaging system, and TTL is a distance on the optical axis from the object-side surface S1 of the first lens L1 to the imaging surface S13 of the optical imaging system;

R5/R6=1.16, where R5 is a curvature radius of the object-side surface S5 of the third lens L3 at the optical axis, and R6 is a curvature radius of the image-side surface S6 of the third lens L3 at the optical axis;

V2/V1=0.36, where V1 is a dispersion coefficient of the first lens L1, and V2 is a dispersion coefficient of the second lens L2;

CT1/OAL=0.2, where CT1 is a thickness of the first lens L1 on the optical axis, and OAL is a distance on the optical axis from the object-side surface S1 of the first lens L1 to the image-side surface S10 of the fifth lens L5; and tan(FOV/2)/EPD=1.22, where FOV is a maximum field-of-view angle of the optical imaging system, and EPD is an entrance pupil diameter of the optical imaging system.

Figure 2A:
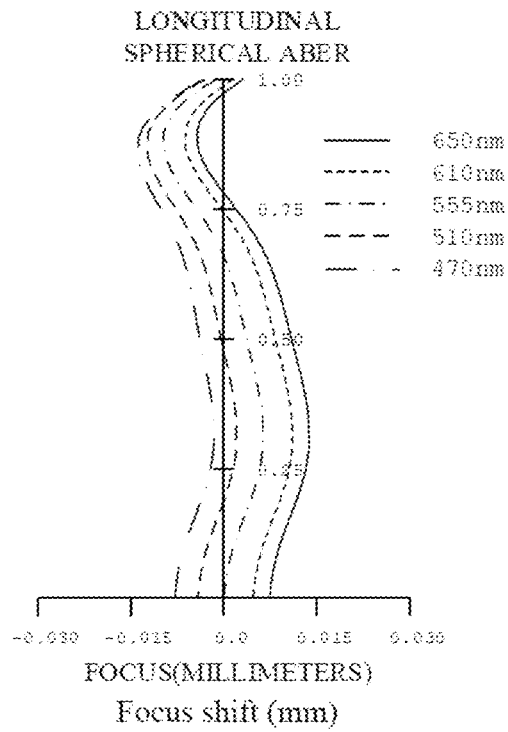
FIG. 2A to FIG. 2C show longitudinal spherical aberration curves, astigmatic field curves and distortion curves of the optical imaging system according to Embodiment 1 respectively.
Figure 2B:
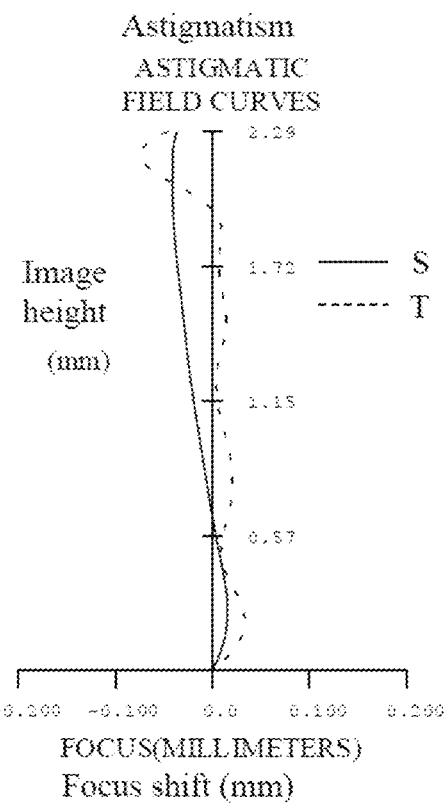
Figure 2C:
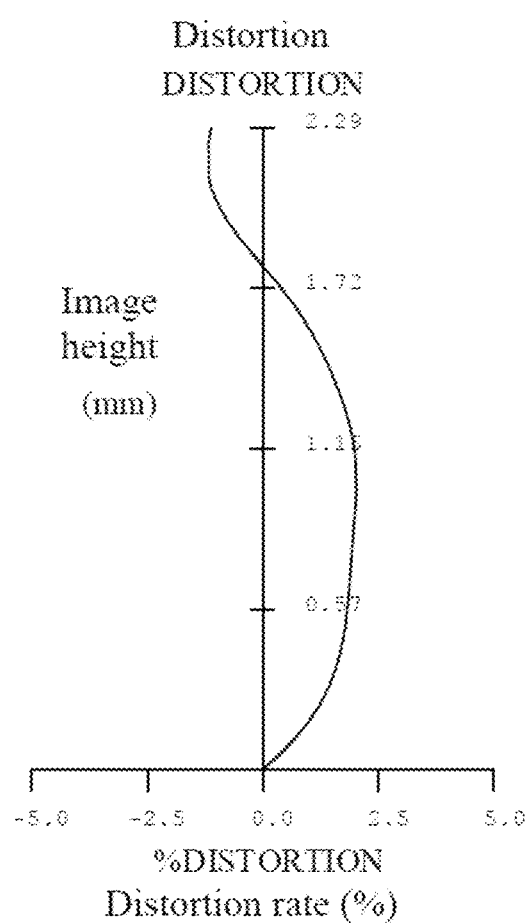

FIG. 2A shows longitudinal spherical aberration curves of the optical imaging system according to Embodiment 1, which respectively indicate focus shift of light with wavelengths of 470 nm, 510 nm, 555 nm, 610 nm and 650 nm after convergence through the optical imaging system. FIG. 2B shows astigmatic field curves of the optical imaging system according to Embodiment 1, which indicate curvature of a tangential image surface and curvature of a sagittal image surface. FIG. 2C shows distortion curves of the optical imaging system according to Embodiment 1, which indicate distortion rates at different image heights. It may be known from FIG. 2A to FIG. 2C that the optical imaging system according to Embodiment 1 can achieve good imaging quality.

Embodiment 2

Figure 3:
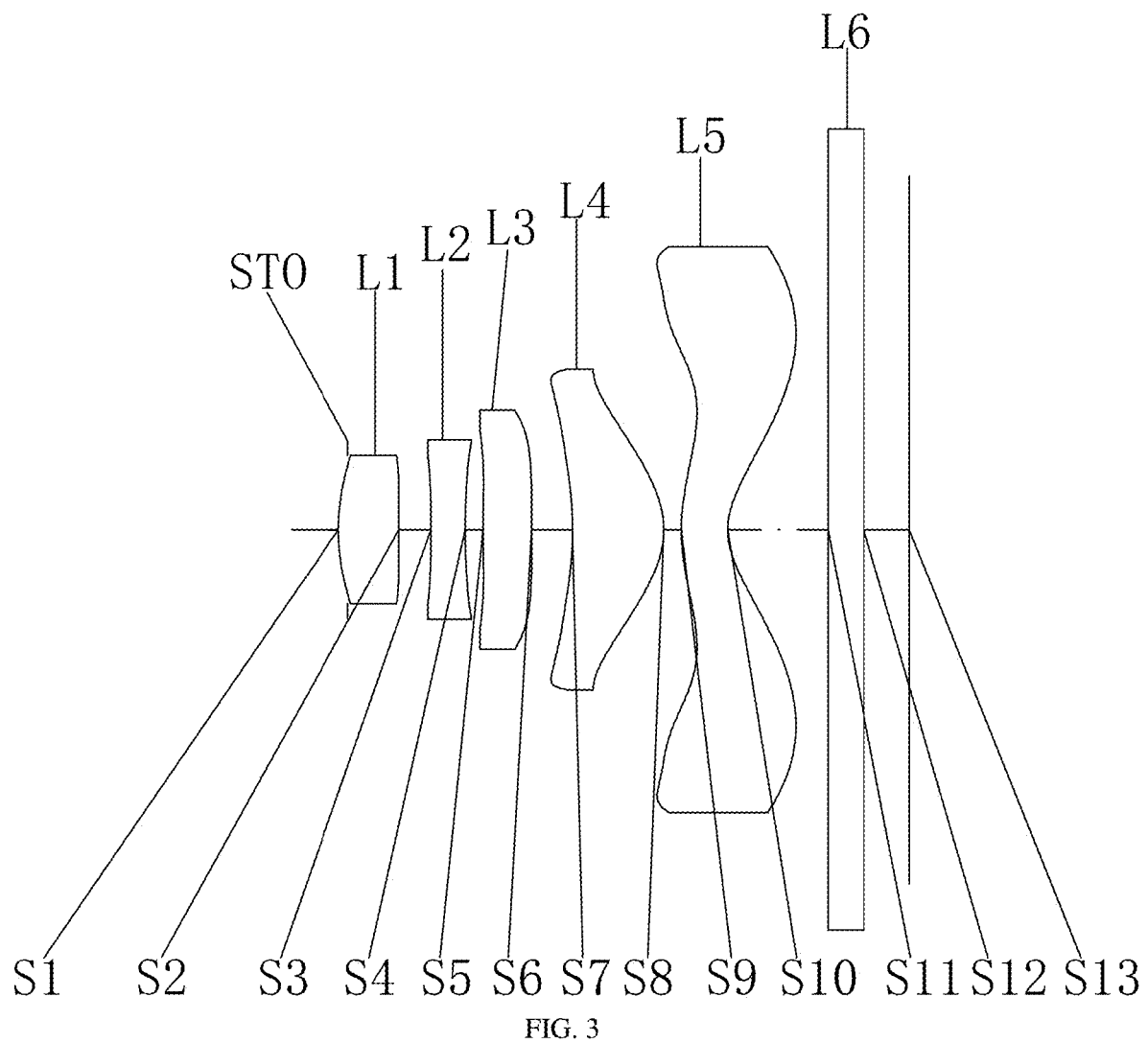
FIG. 3 is a schematic structural diagram of an optical imaging system according to Embodiment 2 of the present disclosure.

An optical imaging system according to Embodiment 2 of the present disclosure is described below with reference to FIG. 3 to FIG. 4C. In this embodiment, for brevity, the description similar to that of Embodiment 1 will be omitted. FIG. 3 is a schematic structural diagram of an optical imaging system according to Embodiment 2 of the present disclosure.

As shown in FIG. 3, the optical imaging system includes a first lens L1, a second lens L2, a third lens L3, a fourth lens L4, a fifth lens L5 and an imaging surface S13 in sequence from an object side to an image side along an optical axis.

The first lens L1 has positive focal power, with an object-side surface S1 and an image-side surface S2 that are aspheric. The object-side surface S1 is convex at the optical axis and convex at the circumference, and the image-side surface S2 is concave at the optical axis and convex at the circumference.

The second lens L2 has negative focal power, with an object-side surface S3 and an image-side surface S4 that are aspheric. The object-side surface S3 is concave at the optical axis and concave at the circumference, and the image-side surface S4 is concave at the optical axis and concave at the circumference.

The third lens L3 has positive focal power, with an object-side surface S5 and an image-side surface S6 that are aspheric. The object-side surface S5 is convex at the optical axis and concave at the circumference, and the image-side surface S6 is concave at the optical axis and convex at the circumference.

The fourth lens L4 has positive focal power, with an object-side surface S7 and an image-side surface S8 that are aspheric. The object-side surface S7 is concave at the optical axis and concave at the circumference, and the image-side surface S8 is convex at the optical axis and convex at the circumference.

The fifth lens L5 has negative focal power, with an object-side surface S9 and an image-side surface S10 that are aspheric. The object-side surface S9 is convex at the optical axis and concave at the circumference, and the image-side surface S10 is concave at the optical axis and convex at the circumference.

A diaphragm is further arranged between an object OBJ and the first lens L1, to further improve the imaging quality of the optical imaging system.

The optical imaging system further includes a filter L6 with an object-side surface S11 and an image-side surface S12. Light from the object OBJ sequentially passes through the surfaces S1 to S12 and is finally imaged on the imaging surface S13. Optionally, the filter L6 is an infrared filter, configured to filter infrared light in external light incident into the optical imaging system to avoid imaging distortion.

Table 3 shows surface types, curvature radii, thicknesses, materials, refractive indexes, Abbe numbers and effective focal lengths of the lenses of the optical imaging system according to Embodiment 2, wherein the curvature radii, the thicknesses and the effective focal lengths of the lenses are all in millimeters (mm). Table 4 shows higher-order-term coefficients applicable to the aspheric surfaces S1 to S10 of the lenses in Embodiment 2, wherein the aspheric surface types may be defined by the formula (1) provided in Embodiment 1. Table 5 shows values of related parameters of the optical imaging system according to Embodiment 2. A reference wavelength is 555 nm.

TABLE 3

Embodiment 2
f = 2.311 mm, FNO = 2.40, FOV = 87°, TTL = 3.323 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.053 | | | | |

TABLE 3-continued

Embodiment 2
f = 2.311 mm, FNO = 2.40, FOV = 87°, TTL = 3.323 mm

| Surface number | Surface name | Surface type | Curvature radius | Thickness | Material | Refractive index | Abbe number | Focal length |
|---|---|---|---|---|---|---|---|---|
| S1 | First lens | Aspheric | 1.550 | 0.352 | Plastic | 1.544 | 56.114 | 2.880 |
| S2 |  | Aspheric | 100.000 | 0.186 |  |  |  |  |
| S3 | Second lens | Aspheric | −11.147 | 0.200 | Plastic | 1.640 | 23.530 | −6.225 |
| S4 |  | Aspheric | 6.314 | 0.104 |  |  |  |  |
| S5 | Third lens | Aspheric | 12.118 | 0.281 | Plastic | 1.544 | 56.114 | 29.438 |
| S6 |  | Aspheric | 48.857 | 0.237 |  |  |  |  |
| S7 | Fourth lens | Aspheric | −3.074 | 0.531 | Plastic | 1.544 | 56.114 | 1.398 |
| S8 |  | Aspheric | −0.649 | 0.102 |  |  |  |  |
| S9 | Fifth lens | Aspheric | 1.360 | 0.270 | Plastic | 1.534 | 55.770 | −1.611 |
| S10 |  | Aspheric | 0.492 | 0.583 |  |  |  |  |
| S11 | Infrared filter | Spherical | Infinity | 0.210 | Glass | 1.517 | 64.167 |  |
| S12 |  | Spherical | Infinity | 0.267 |  |  |  |  |
| S13 | Imaging surface | Spherical | Infinity | 0.000 |  |  |  |  |

TABLE 4

Embodiment 2
Aspheric coefficient

| Surface number | S1 | S2 | S3 | S4 | S5 |
|---|---|---|---|---|---|
| K | −1.1378E+00 | −9.9000E+01 | 9.3423E+01 | 4.2417E+01 | 9.4522E+01 |
| A4 | 4.7201E−02 | −1.2536E−01 | 9.6936E−02 | 1.5260E−01 | −4.2777E−01 |
| A6 | −5.2763E+00 | −3.5783E+00 | −5.7125E+00 | −1.7500E+00 | 4.4580E+00 |
| A8 | 1.5874E+02 | 9.9468E+01 | 1.1365E+02 | 1.4644E+01 | −4.7600E+01 |
| A10 | −2.7397E+03 | −1.7640E+03 | −1.5413E+03 | −7.3704E+01 | 2.9162E+02 |
| A12 | 2.8388E+04 | 1.8903E+04 | 1.3621E+04 | 2.0880E+02 | −1.1013E+03 |
| A14 | −1.8072E+05 | −1.2388E+05 | −7.7203E+04 | −1.9321E+02 | 2.5998E+03 |
| A16 | 6.9097E+05 | 4.8364E+05 | 2.6941E+05 | −6.0391E+02 | −3.6960E+03 |
| A18 | −1.4547E+06 | −1.0311E+06 | −5.2591E+05 | 1.8798E+03 | 2.8608E+03 |
| A20 | 1.2951E+06 | 9.2286E+05 | 4.3900E+05 | −1.5438E+03 | −9.1742E+02 |

| Surface number | S6 | S7 | S8 | S9 | S10 |
|---|---|---|---|---|---|
| K | −9.9000E+01 | −7.5828E+01 | −1.8272E+00 | −2.1963E+01 | −3.7625E+00 |
| A4 | −4.9076E−01 | −6.0956E−01 | 4.0766E−01 | 1.0691E−01 | −2.4725E−02 |
| A6 | 2.7376E+00 | 2.4912E+00 | −1.9287E+00 | −4.4297E−01 | −2.2891E−01 |
| A8 | −1.1713E+01 | 8.1105E+01 | 4.6408E+01 | 2.5805E−01 | 3.5099E−01 |
| A10 | 1.9604E+01 | −2.0368E+01 | −2.4053E+01 | 3.3671E−02 | −3.0010E−01 |
| A12 | 1.5491E+01 | 8.1105E+01 | 4.6408E+01 | −1.1229E−01 | 1.6191E−01 |
| A14 | −1.3627E+02 | −1.5550E+02 | −5.8846E+01 | 6.9135E−02 | −5.5430E−02 |
| A1b | 2.6203E+02 | 1.6923E+02 | 4.6722E+01 | −2.2894E−02 | 1.1575E−02 |
| A18 | −2.2884E+02 | −9.9394E+01 | −2.0849E+01 | 4.0407E−03 | −1.3332E−03 |
| A20 | 7.8272E+01 | 2.4409E+01 | 3.9585E+00 | −2.9148E−04 | 6.4306E−05 |

TABLE 5

| f (mm) | 2.31 | SD11/ImgH | 0.21 |
|---|---|---|---|
| FNO | 2.4 | R1/f1 | 0.54 |
| FOV (°) | 87 | f5/f | −0.70 |
| ImgH (mm) | 2.30 | ImgH/TTL | 0.69 |
| TTL (mm) | 3.32 | R5/R6 | 0.25 |
| SD11/SD12 | 1.01 | V2/V1 | 0.42 |
| |θ|$_{(°)}$ | 14.4 | CT1/OAL | 0.16 |
| SD11/SD52 | 0.26 | tan(FOV/2)/EPD (mm$^{-1}$) | 0.99 |

Figure 4A:
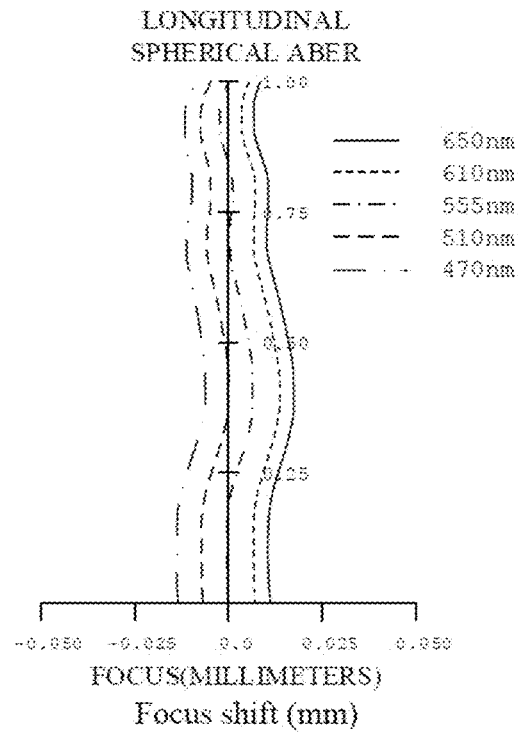
FIG. 4A to FIG. 4C show longitudinal spherical aberration curves, astigmatic field curves and distortion curves of the optical imaging system according to Embodiment 2 respectively.
Figure 4B:
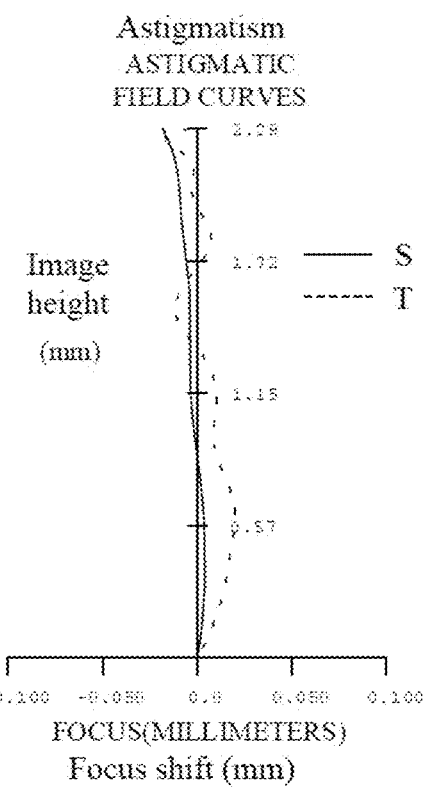
Figure 4C:
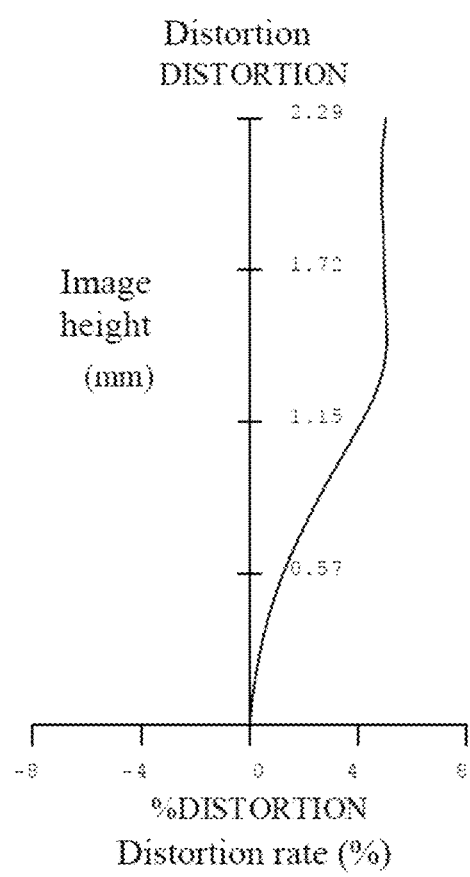

FIG. 4A shows longitudinal spherical aberration curves of the optical imaging system according to Embodiment 2, which respectively indicate focus shift of light with different wavelengths after convergence through the optical imaging system. FIG. 4B shows astigmatic field curves of the optical imaging system according to Embodiment 2, which indicate curvature of a tangential image surface and curvature of a sagittal image surface. FIG. 4C shows distortion curves of the optical imaging system according to Embodiment 2, which indicate distortion rates at different image heights. It may be known from FIG. 4A to FIG. 4C that the optical imaging system according to Embodiment 2 can achieve good imaging quality.

Embodiment 3

Figure 5:
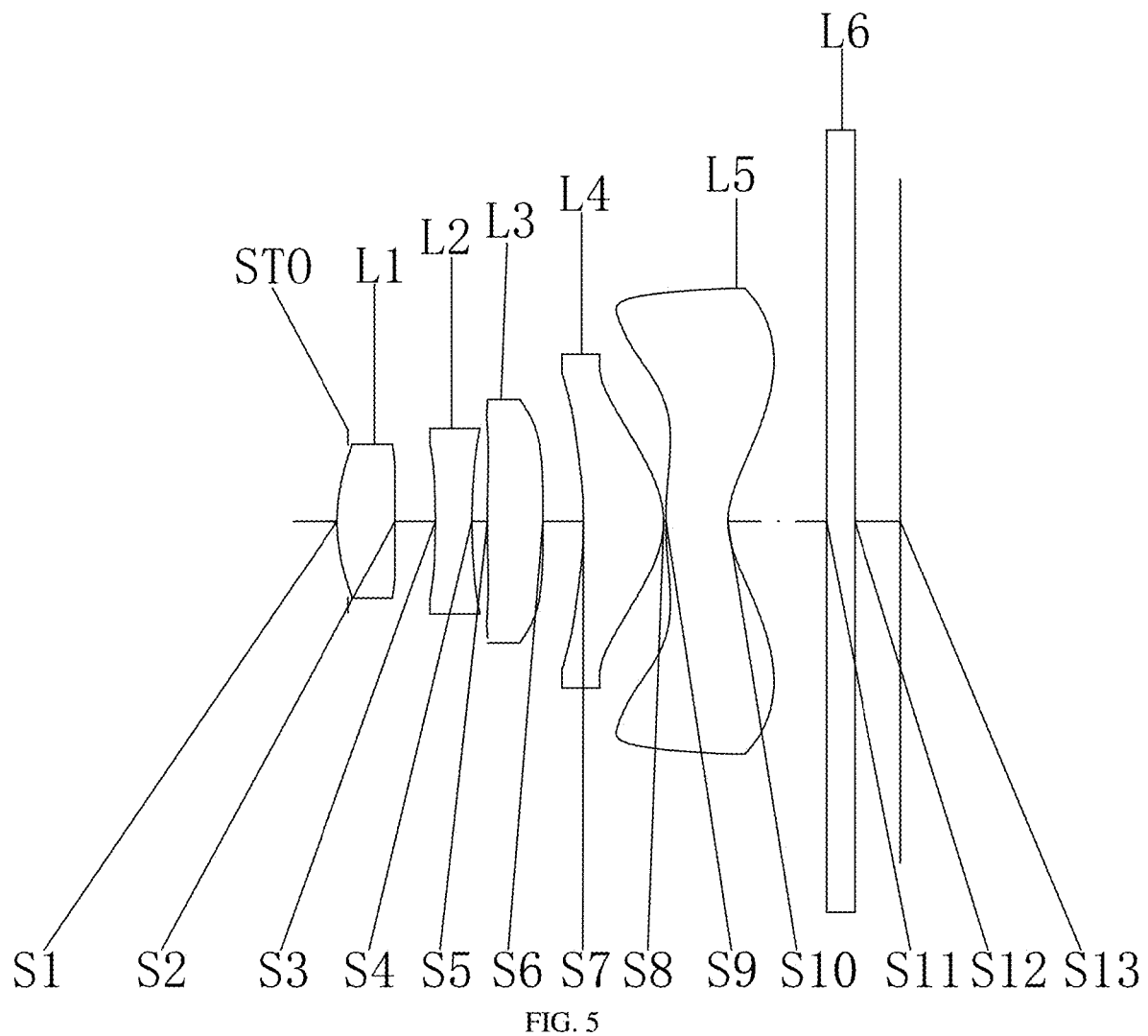
FIG. 5 is a schematic structural diagram of an optical imaging system according to Embodiment 3 of the present disclosure.

An optical imaging system according to Embodiment 3 of the present disclosure is described below with reference to FIG. 5 to FIG. 6C. In this embodiment, for brevity, the description similar to that of Embodiment 1 will be omitted. FIG. 5 is a schematic structural diagram of an optical imaging system according to Embodiment 3 of the present disclosure.

As shown in FIG. 5, the optical imaging system includes a first lens L1, a second lens L2, a third lens L3, a fourth lens L4, a fifth lens L5 and an imaging surface S13 in sequence from an object side to an image side along an optical axis.

The first lens L1 has positive focal power, with an object-side surface S1 and an image-side surface S2 that are aspheric. The object-side surface S1 is convex at the optical axis and convex at the circumference, and the image-side surface S2 is concave at the optical axis and convex at the circumference.

The second lens L2 has negative focal power, with an object-side surface S3 and an image-side surface S4 that are aspheric. The object-side surface S3 is concave at the optical axis and concave at the circumference, and the image-side surface S4 is concave at the optical axis and concave at the circumference.

The third lens L3 has positive focal power, with an object-side surface S5 and an image-side surface S6 that are aspheric. The object-side surface S5 is convex at the optical axis and convex at the circumference, and the image-side surface S6 is convex at the optical axis and convex at the circumference.

The fourth lens L4 has positive focal power, with an object-side surface S7 and an image-side surface S8 that are aspheric. The object-side surface S7 is concave at the optical axis and concave at the circumference, and the image-side surface S8 is convex at the optical axis and concave at the circumference.

The fifth lens L5 has negative focal power, with an object-side surface S9 and an image-side surface S10 that are aspheric. The object-side surface S9 is convex at the optical axis and concave at the circumference, and the image-side surface S10 is concave at the optical axis and convex at the circumference.

A diaphragm is further arranged between an object OBJ and the first lens L1, to further improve the imaging quality of the optical imaging system.

The optical imaging system further includes a filter L6 with an object-side surface S11 and an image-side surface S12. Light from the object OBJ sequentially passes through the surfaces S1 to S12 and is finally imaged on the imaging surface S13. Optionally, the filter L6 is an infrared filter, configured to filter infrared light in external light incident into the optical imaging system to avoid imaging distortion.

Table 6 shows surface types, curvature radii, thicknesses, materials, refractive indexes, Abbe numbers and effective focal lengths of the lenses of the optical imaging system according to Embodiment 3, wherein the curvature radii, the thicknesses, and the effective focal lengths of the lenses are all in millimeters (mm). Table 7 shows higher-order-term coefficients applicable to the aspheric surfaces S1 to S10 of the lenses in Embodiment 3, wherein the aspheric surface types may be defined by the formula (1) provided in Embodiment 1. Table 8 shows values of related parameters of the optical imaging system according to Embodiment 3. A reference wavelength is 555 nm.

TABLE 6

Embodiment 3
f = 3.037 mm, FNO = 2.4, FOV = 83.2°, TTL = 4.171 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.081 | | | | |
| S1 | First lens | Aspheric | 1.722 | 0.428 | Plastic | 1.544 | 56.114 | 3.267 |
| S2 | | Aspheric | 45.683 | 0.299 | | | | |
| S3 | Second lens | Aspheric | −7.834 | 0.271 | Plastic | 1.544 | 56.114 | −5.521 |
| S4 | | Aspheric | 6.610 | 0.113 | | | | |
| S5 | Third lens | Aspheric | 9.744 | 0.411 | Plastic | 1.640 | 23.530 | 16.935 |
| S6 | | Aspheric | −177.876 | 0.300 | | | | |
| S7 | Fourth lens | Aspheric | −4.541 | 0.593 | Plastic | 1.544 | 56.114 | 1.693 |
| S8 | | Aspheric | −0.803 | 0.017 | | | | |
| S9 | Fifth lens | Aspheric | 3.072 | 0.460 | Plastic | 1.544 | 56.114 | −1.780 |
| S10 | | Aspheric | 0.699 | 0.731 | | | | |
| S11 | Infrared filter | Spherical | Infinity | 0.210 | Glass | 1.517 | 64.167 | |
| S12 | | Spherical | Infinity | 0.338 | | | | |
| S13 | Imaging surface | Spherical | Infinity | 0.000 | | | | |

TABLE 7

Embodiment 3
Aspheric coefficient

| Surface number | S1 | S2 | S3 | S4 | S5 |
|---|---|---|---|---|---|
| K | −1.0206E+00 | 4.3312E+01 | 8.8894E+01 | 4.0148E+01 | 9.8941E+01 |
| A4 | 1.7680E−02 | −8.5606E−02 | 2.5372E−02 | 8.0007E−02 | −1.0659E−01 |
| A6 | −9.7297E−01 | −1.8935E−01 | −1.1511E+00 | −8.1189E−01 | −3.9920E−02 |
| A8 | 1.7674E+01 | 2.0150E+00 | 1.2424E+01 | 5.4064E+00 | 3.5626E−01 |
| A10 | −1.8442E+02 | −2.3105E+01 | −9.1551E+01 | −2.2763E+01 | −2.5474E+00 |
| A12 | 1.1332E+03 | 1.3171E+02 | 4.3771E+02 | 6.1648E+01 | 9.7986E+00 |
| A14 | −4.2340E+03 | −4.0549E+02 | −1.3529E+03 | −1.0564E+02 | −2.0888E+01 |
| A16 | 9.4377E+03 | 6.2293E+02 | 2.6056E+03 | 1.0859E+02 | 2.4919E+01 |
| A18 | −1.1535E+04 | −3.3526E+02 | −2.8432E+03 | −5.9061E+01 | −1.5118E+01 |
| A20 | 5.9467E+03 | −7.9391E+01 | 1.3441E+03 | 1.2201E+01 | 3.5156E+00 |

| Surface number | S6 | S7 | S8 | S9 | S10 |
|---|---|---|---|---|---|
| K | −9.9000E+01 | −9.1495E+01 | −2.0090E+00 | −9.9000E+01 | −4.2204E+00 |
| A4 | −2.3235E−01 | −3.1172E−01 | 1.9322E−01 | 5.6106E−02 | −1.1543E−01 |

TABLE 7-continued

Embodiment 3
Aspheric coefficient

| A6  | 5.7039E−01  | 1.0123E+00  | −4.0518E−01 | −3.6321E−01 | 5.5981E−02  |
| --- | ----------- | ----------- | ----------- | ----------- | ----------- |
| A8  | −1.4855E+00 | −1.5784E+00 | 7.7572E−01  | 4.3300E−01  | −4.1028E−02 |
| A10 | 2.3321E+00  | 1.3902E+00  | −8.9814E−01 | −3.7454E−01 | 3.0392E−02  |
| A12 | −3.6175E+00 | −7.9628E−01 | 6.1067E−01  | 2.3758E−01  | −1.6553E−02 |
| A14 | 5.7044E+00  | 3.5338E−01  | −2.4164E−01 | −1.0111E−01 | 5.7880E−03  |
| A16 | −6.5205E+00 | −1.6424E−01 | 6.2253E−02  | 2.7655E−02  | −1.2273E−03 |
| A18 | 4.1743E+00  | 7.5800E−02  | −1.3262E−02 | −4.4687E−03 | 1.4365E−04  |
| A20 | −1.0887E+00 | −1.7807E−02 | 1.8056E−03  | 3.2476E−04  | −7.1315E−06 |

TABLE 8

| f (mm)     | 3.04 | SD11/ImgH          | 0.23  |
| ---------- | ---- | ------------------ | ----- |
| FNO        | 2.4  | R1/f1              | 0.53  |
| FOV (°)    | 83.2 | f5/f               | −0.59 |
| ImgH (mm)  | 2.82 | ImgH/TTL           | 0.68  |
| TTL (mm)   | 4.17 | R5/R6              | −0.05 |
| SD11/SD12  | 1.02 | V2/V1              | 1.00  |
| \|θ\|(°)   | 16.3 | CT1/OAL            | 0.15  |
| SD11/SD52  | 0.30 | tan(FOV/2)/EPD (mm$^{-1}$) | 0.70  |

Figure 6A:
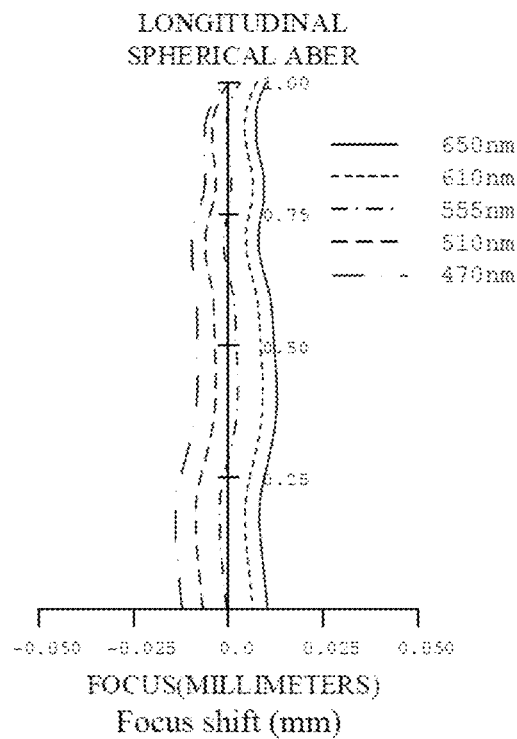
FIG. 6A to FIG. 6C show longitudinal spherical aberration curves, astigmatic field curves and distortion curves of the optical imaging system according to Embodiment 3 respectively.
Figure 6B:
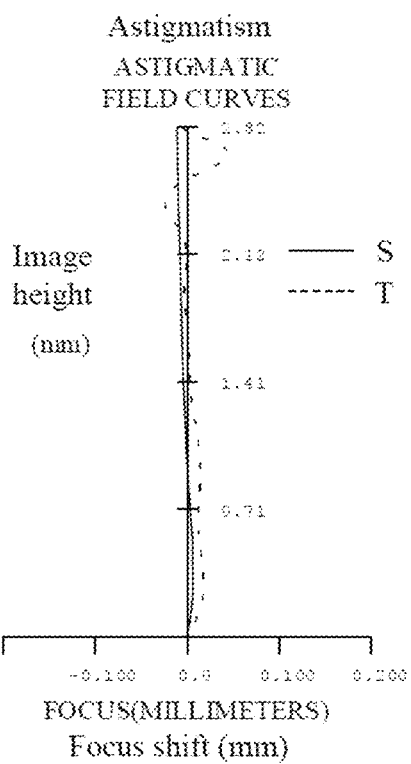
Figure 6C:
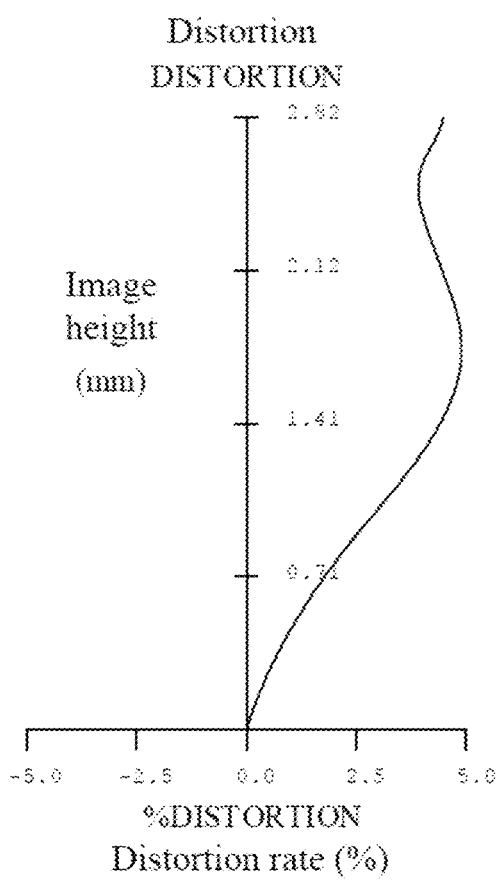

FIG. 6A shows longitudinal spherical aberration curves of the optical imaging system according to Embodiment 3, which respectively indicate focus shift of light with different wavelengths after convergence through the optical imaging system. FIG. 6B shows astigmatic field curves of the optical imaging system according to Embodiment 3, which indicate curvature of a tangential image surface and curvature of a sagittal image surface. FIG. 6C shows distortion curves of the optical imaging system according to Embodiment 3, which indicate distortion rates at different image heights. It may be known from FIG. 6A to FIG. 6C that the optical imaging system according to Embodiment 3 can achieve good imaging quality.

Embodiment 4

Figure 7:
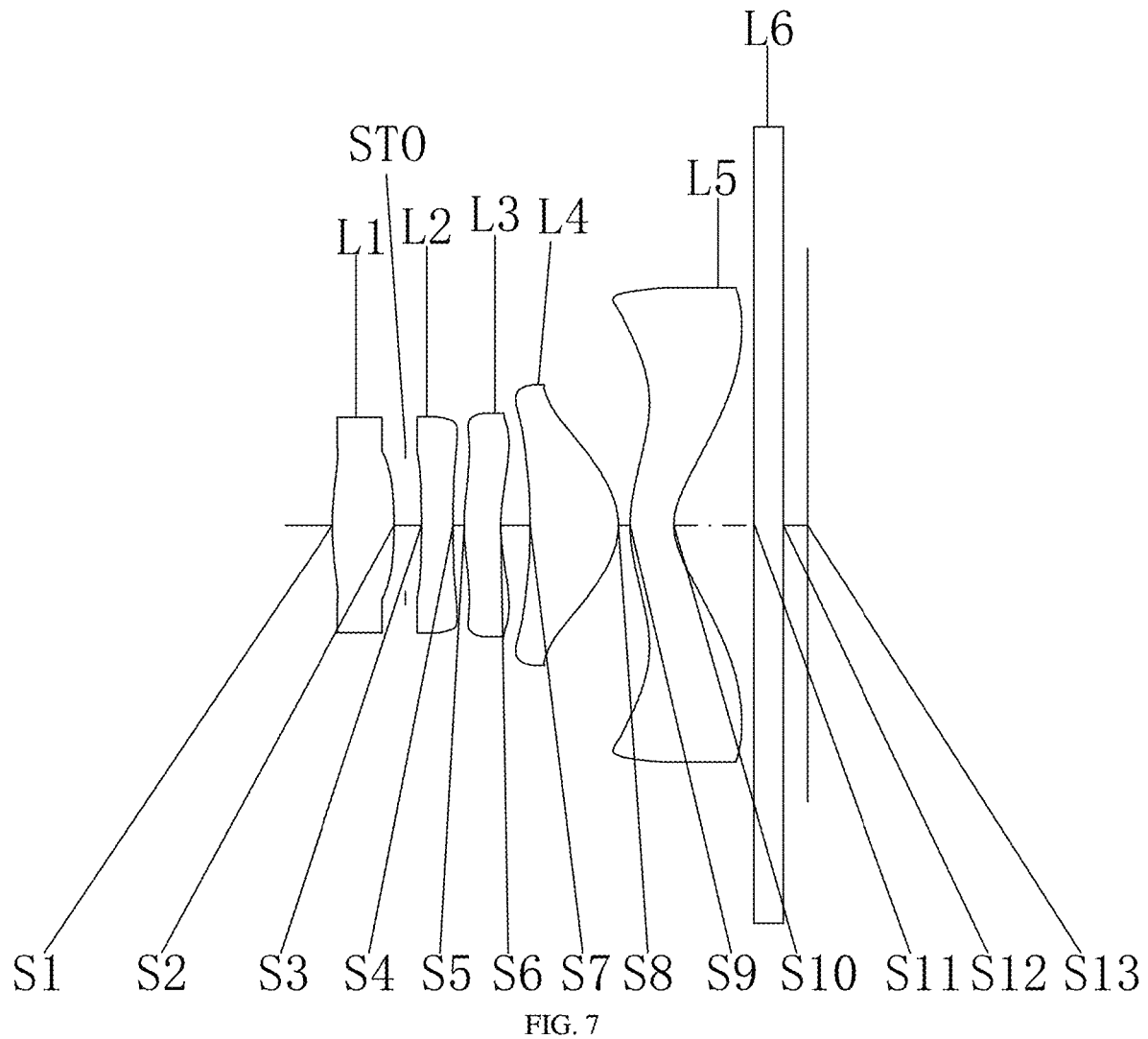
FIG. 7 is a schematic structural diagram of an optical imaging system according to Embodiment 4 of the present disclosure.

An optical imaging system according to Embodiment 4 of the present disclosure is described below with reference to FIG. 7 to FIG. 8C. In this embodiment, for brevity, the description similar to that of Embodiment 1 will be omitted. FIG. 7 is a schematic structural diagram of an optical imaging system according to Embodiment 4 of the present disclosure.

As shown in FIG. 7, the optical imaging system includes a first lens L1, a second lens L2, a third lens L3, a fourth lens L4, a fifth lens L5 and an imaging surface S13 in sequence from an object side to an image side along an optical axis.

The first lens L1 has positive focal power, with an object-side surface S1 and an image-side surface S2 that are aspheric. The object-side surface S1 is convex at the optical axis and concave at the circumference, and the image-side surface S2 is convex at the optical axis and convex at the circumference.

The second lens L2 has negative focal power, with an object-side surface S3 and an image-side surface S4 that are aspheric. The object-side surface S3 is concave at the optical axis and concave at the circumference, and the image-side surface S4 is concave at the optical axis and concave at the circumference.

The third lens L3 has negative focal power, with an object-side surface S5 and an image-side surface S6 that are aspheric. The object-side surface S5 is convex at the optical axis and concave at the circumference, and the image-side surface S6 is concave at the optical axis and convex at the circumference.

The fourth lens L4 has positive focal power, with an object-side surface S7 and an image-side surface S8 that are aspheric. The object-side surface S7 is concave at the optical axis and concave at the circumference, and the image-side surface S8 is convex at the optical axis and convex at the circumference.

The fifth lens L5 has negative focal power, with an object-side surface S9 and an image-side surface S10 that are aspheric. The object-side surface S9 is convex at the optical axis and concave at the circumference, and the image-side surface S10 is concave at the optical axis and convex at the circumference.

A diaphragm STO is further arranged between the first lens L1 and the second lens L2, to further improve the imaging quality of the optical imaging system.

The optical imaging system further includes a filter L6 with an object-side surface S11 and an image-side surface S12. Light from the object OBJ sequentially passes through the surfaces S1 to S12 and is finally imaged on the imaging surface S13. Optionally, the filter L6 is an infrared filter, configured to filter infrared light in external light incident into the optical imaging system to avoid imaging distortion.

Table 9 shows surface types, curvature radii, thicknesses, materials, refractive indexes, Abbe numbers and effective focal lengths of the lenses of the optical imaging system according to Embodiment 4, wherein the curvature radii, the thicknesses, and the effective focal lengths of the lenses are all in millimeters (mm). Table 10 shows higher-order-term coefficients applicable to the aspheric surfaces S1 to S10 of the lenses in Embodiment 4, wherein the aspheric surface types may be defined by the formula (1) provided in Embodiment 1. Table 11 shows values of related parameters of the optical imaging system according to Embodiment 4. A reference wavelength is 555 nm.

TABLE 9

Embodiment 4
f = 2.087 mm, FNO = 1.85, FOV = 92.7°, TTL = 3.362 mm

| Surface number | Surface name | Surface type | Curvature radius | Thickness | Material | Refractive index | Abbe number | Focal length |
| --- | --- | --- | --- | --- | --- | --- | --- | --- |
| OBJ | Object surface | Spherical | Infinity | Infinity | | | | |
| S1 | First lens | Aspheric | 2.502 | 0.438 | Plastic | 1.536 | 55.190 | 8.005 |
| S2 | | Aspheric | −4.302 | 0.081 | | | | |

TABLE 9-continued

Embodiment 4
f = 2.087 mm, FNO = 1.85, FOV = 92.7°, TTL = 3.362 mm

| Surface number | Surface name | Surface type | Curvature radius | Thickness | Material | Refractive index | Abbe number | Focal length |
|---|---|---|---|---|---|---|---|---|
| STO | Diaphragm | Spherical | Infinity | 0.113 | | | | |
| S3 | Second lens | Aspheric | −9.533 | 0.222 | Plastic | 1.660 | 20.400 | −7.957 |
| S4 | | Aspheric | 12.034 | 0.081 | | | | |
| S5 | Third lens | Aspheric | 2.128 | 0.259 | Plastic | 1.537 | 53.730 | −14.638 |
| S6 | | Aspheric | 1.604 | 0.208 | | | | |
| S7 | Fourth lens | Aspheric | −5.179 | 0.624 | Plastic | 53.915 | 52.390 | 1.261 |
| S8 | | Aspheric | −0.628 | 0.082 | | | | |
| S9 | Fifth lens | Aspheric | 1.183 | 0.310 | Plastic | 1.609 | 27.160 | −1.678 |
| S10 | | Aspheric | 0.495 | 0.565 | | | | |
| S11 | Infrared filter | Spherical | Infinity | 0.210 | Glass | 1.517 | 64.167 | |
| S12 | | Spherical | Infinity | 0.170 | | | | |
| S13 | Imaging surface | Spherical | Infinity | 0.000 | | | | |

TABLE 10

Embodiment 4
Aspheric coefficient

| Surface number | S1 | S2 | S3 | S4 | S5 |
|---|---|---|---|---|---|
| K | −9.3001E+00 | 4.4834E+01 | 9.6310E+01 | −5.8951E+01 | −1.4382E+01 |
| A4 | −1.8046E−01 | −2.3323E−01 | 7.9442E−02 | 1.9551E−01 | −3.3685E−01 |
| A6 | 1.9862E+00 | −2.5641E−01 | 1.9467E−01 | 8.0685E−02 | 7.3414E−01 |
| A8 | −2.9848E+01 | 1.7116E+01 | −2.9489E+01 | −1.0108E+01 | −5.6217E+00 |
| A10 | 2.4080E+02 | −3.9972E+02 | 3.5683E+02 | 8.6076E+01 | 2.6955E+01 |
| A12 | −1.2410E+03 | 4.1334E+03 | −2.2458E+03 | −3.9483E+02 | −6.3822E+01 |
| A14 | 4.0867E+03 | −2.3043E+04 | 8.2627E+03 | 1.0876E+03 | 5.0035E+01 |
| A16 | −8.3698E+03 | 7.2370E+04 | −1.7798E+04 | −1.7953E+03 | 7.3456E+01 |
| A18 | 9.7013E+03 | −1.2065E+05 | 2.0793E+04 | 1.6354E+03 | −1.6749E+02 |
| A20 | −4.8598E+03 | 8.3132E+04 | −1.0170E+04 | −6.3149E+02 | 9.0829E+01 |

| Surface number | S6 | S7 | S8 | S9 | S10 |
|---|---|---|---|---|---|
| K | −6.6250E+00 | −9.8822E+01 | −1.5703E+00 | −2.1883E+01 | −4.0463E+00 |
| A4 | −6.3383E−01 | −2.0229E−01 | 1.6870E−01 | 1.9509E−01 | −5.1276E−02 |
| A6 | 3.4215E+00 | −3.8267E−01 | 8.0183E−01 | −7.7437E−01 | −2.0385E−02 |
| A8 | −1.8809E+01 | 8.9374E+00 | −9.0396E+00 | 1.4796E+00 | 4.1799E−02 |
| A10 | 7.0874E+01 | −4.2331E+01 | 3.5957E+01 | −1.8917E+00 | −3.8795E−02 |
| A12 | −1.8259E+02 | 1.0613E+02 | −7.8058E+01 | 1.5312E+00 | 2.1289E−02 |
| A14 | 3.1391E+02 | −1.5911E+02 | 1.0049E+02 | −7.6550E−01 | −6.8026E−03 |
| A16 | −3.4548E+02 | 1.4169E+02 | −7.5962E+01 | 2.2887E−01 | 1.2188E−03 |
| A18 | 2.1933E+02 | −6.8682E+01 | 3.1067E+01 | −3.7485E−02 | −1.1086E−04 |
| A20 | −6.0330E+01 | 1.3917E+01 | −5.3008E+00 | 2.5853E−03 | 3.7915E−06 |

TABLE 11

| f (mm) | 2.09 | SD11/ImgH | 0.27 |
|---|---|---|---|
| FNO | 1.85 | R1/f1 | 0.31 |
| FOV (°) | 92.7 | f5/f | −0.80 |
| ImgH (mm) | 2.30 | ImgH/TTL | 0.68 |
| TTL (mm) | 3.36 | R5/R6 | 1.33 |
| SD11/SD12 | 1.05 | V2/V1 | 0.37 |
| |θ|(°) | 19.8 | CT1/OAL | 0.18 |
| SD11/SD52 | 0.31 | tan(FOV/2)/EPD (mm⁻¹) | 0.93 |

Figure 8A:
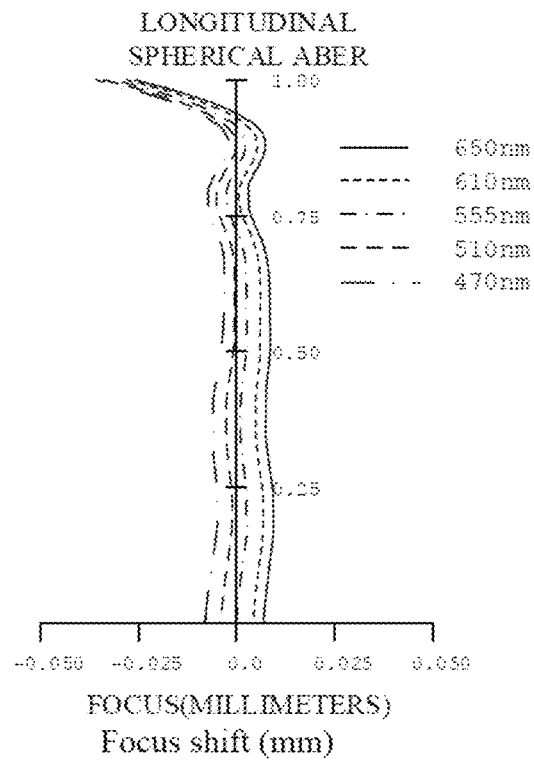
FIG. 8A to FIG. 8C show longitudinal spherical aberration curves, astigmatic field curves and distortion curves of the optical imaging system according to Embodiment 4 respectively.
Figure 8B:
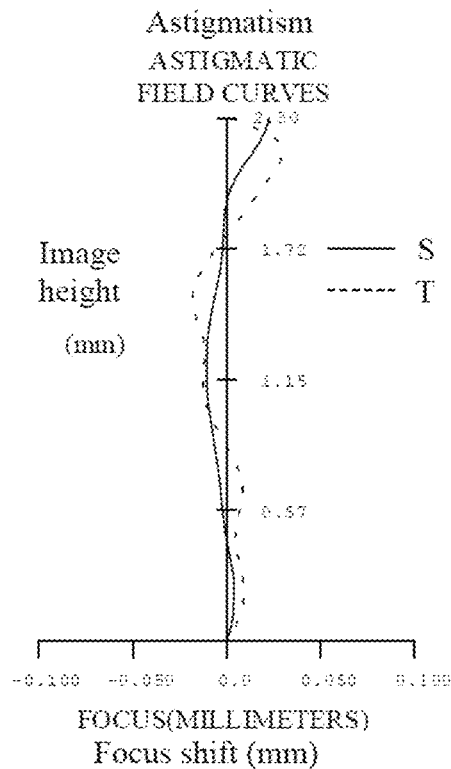
Figure 8C:
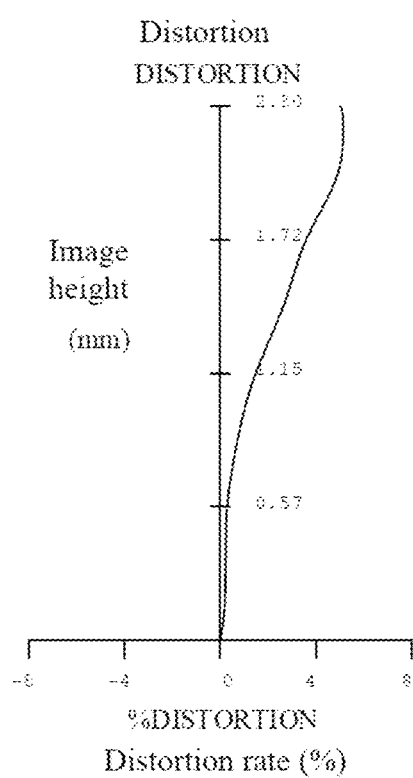

FIG. 8A shows longitudinal spherical aberration curves of the optical imaging system according to Embodiment 4, which respectively indicate focus shift of light with different wavelengths after convergence through the optical imaging system. FIG. 8B shows astigmatic field curves of the optical imaging system according to Embodiment 4, which indicate curvature of a tangential image surface and curvature of a sagittal image surface. FIG. 8C shows distortion curves of the optical imaging system according to Embodiment 4, which indicate distortion rates at different image heights. It may be known from FIG. 8A to FIG. 8C that the optical imaging system according to Embodiment 4 can achieve good imaging quality.

Embodiment 5

Figure 9:
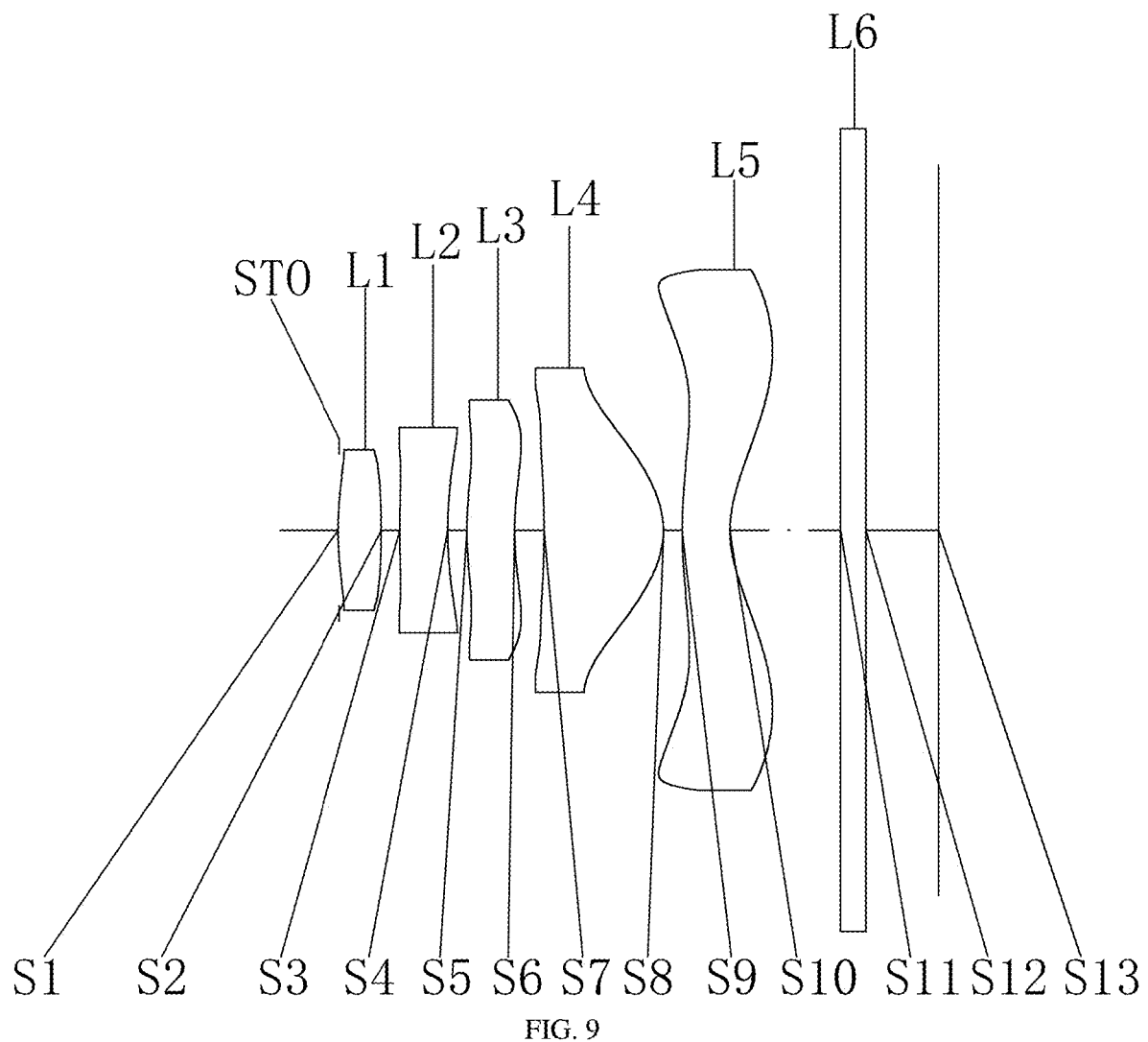
FIG. 9 is a schematic structural diagram of an optical imaging system according to Embodiment 5 of the present disclosure.

An optical imaging system according to Embodiment 5 of the present disclosure is described below with reference to FIG. 9 to FIG. 10C. In this embodiment, for brevity, the description similar to that of Embodiment 1 will be omitted. FIG. 9 is a schematic structural diagram of an optical imaging system according to Embodiment 5 of the present disclosure.

As shown in FIG. 9, the optical imaging system includes a first lens L1, a second lens L2, a third lens L3, a fourth lens L4, a fifth lens L5 and an imaging surface S13 in sequence from an object side to an image side along an optical axis.

The first lens L1 has positive focal power, with an object-side surface S1 and an image-side surface S2 that are aspheric. The object-side surface S1 is convex at the optical axis and convex at the circumference, and the image-side surface S2 is convex at the optical axis and convex at the circumference.

The second lens L2 has negative focal power, with an object-side surface S3 and an image-side surface S4 that are aspheric. The object-side surface S3 is convex at the optical axis and concave at the circumference, and the image-side surface S4 is concave at the optical axis and concave at the circumference.

The third lens L3 has negative focal power, with an object-side surface S5 and an image-side surface S6 that are aspheric. The object-side surface S5 is convex at the optical axis and convex at the circumference, and the image-side surface S6 is concave at the optical axis and convex at the circumference.

The fourth lens L4 has positive focal power, with an object-side surface S7 and an image-side surface S8 that are aspheric. The object-side surface S7 is concave at the optical axis and concave at the circumference, and the image-side surface S8 is convex at the optical axis and convex at the circumference.

The fifth lens L5 has negative focal power, with an object-side surface S9 and an image-side surface S10 that are aspheric. The object-side surface S9 is convex at the optical axis and concave at the circumference, and the image-side surface S10 is concave at the optical axis and convex at the circumference.

A diaphragm is further arranged between an object OBJ and the first lens L1, to further improve the imaging quality of the optical imaging system.

The optical imaging system further includes a filter L6 with an object-side surface S11 and an image-side surface S12. Light from the object OBJ sequentially passes through the surfaces S1 to S12 and is finally imaged on the imaging surface S13. Optionally, the filter L6 is an infrared filter, configured to filter infrared light in external light incident into the optical imaging system to avoid imaging distortion.

Table 12 shows surface types, curvature radii, thicknesses, materials, refractive indexes, Abbe numbers and effective focal lengths of the lenses of the optical imaging system according to Embodiment 5, wherein the curvature radii, the thicknesses, and the effective focal lengths of the lenses are all in millimeters (mm). Table 13 shows higher-order-term coefficients applicable to the aspheric surfaces S1 to S10 of the lenses in Embodiment 5, wherein the aspheric surface types may be defined by the formula (1) provided in Embodiment 1. Table 14 shows values of related parameters of the optical imaging system according to Embodiment 5. A reference wavelength is 555 nm.

TABLE 12

Embodiment 5
f = 1.603 mm, FNO = 2.2, FOV = 95.5°, TTL = 2.573 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.005 | | | | |
| S1 | First lens | Aspheric | 1.971 | 0.184 | Plastic | 1.540 | 55.790 | 2.568 |
| S2 | | Aspheric | −4.439 | 0.082 | | | | |
| S3 | Second lens | Aspheric | 102.000 | 0.204 | Plastic | 1.660 | 20.400 | −4.099 |
| S4 | | Aspheric | 2.656 | 0.082 | | | | |
| S5 | Third lens | Aspheric | 1.694 | 0.204 | Plastic | 1.551 | 44.700 | −18.433 |
| S6 | | Aspheric | 1.390 | 0.126 | | | | |
| S7 | Fourth lens | Aspheric | −13.397 | 0.512 | Plastic | 1.569 | 37.240 | 0.846 |
| S8 | | Aspheric | −0.473 | 0.082 | | | | |
| S9 | Fifth lens | Aspheric | 2.812 | 0.204 | Plastic | 1.660 | 20.400 | −1.283 |
| S10 | | Aspheric | 0.636 | 0.473 | | | | |
| S11 | Infrared filter | Spherical | Infinity | 0.112 | Glass | 1.517 | 64.167 | |
| S12 | | Spherical | Infinity | 0.311 | | | | |
| S13 | Imaging surface | Spherical | Infinity | 0.000 | | | | |

TABLE 13

Embodiment 5
Aspheric coefficient

| Surface number | S1 | S2 | S3 | S4 | S5 |
|---|---|---|---|---|---|
| K | −7.2849E+00 | 7.6412E+01 | −9.9000E+01 | −3.8202E+01 | −2.0588E+01 |
| A4 | −3.3370E−01 | −1.4941E−01 | 1.2572E+00 | 1.4524E+00 | −1.3709E+00 |
| A6 | 1.4101E+01 | 1.7853E+01 | −5.3450E+01 | −3.2865E+01 | 2.9636E+01 |
| A8 | −6.6571E+02 | −9.5086E+02 | 1.8207E+03 | 5.2928E+02 | −6.8466E+02 |
| A10 | 1.7471E+04 | 2.5368E+04 | −4.0204E+04 | −5.2169E+03 | 8.8089E+03 |
| A12 | −2.8273E+05 | −4.2247E+05 | 5.5016E+05 | 3.0848E+04 | −6.8747E+04 |
| A14 | 2.8010E+06 | 4.3653E+06 | −4.7148E+06 | −1.0701E+05 | 3.3680E+05 |
| A16 | −1.6584E+07 | −2.7193E+07 | 2.4553E+07 | 1.9034E+05 | −1.0135E+06 |
| A18 | 5.3895E+07 | 9.3500E+07 | −7.0876E+07 | −8.8584E+04 | 1.7106E+06 |
| A20 | −7.4077E+07 | −1.3613E+08 | 8.6874E+07 | −1.1863E+05 | −1.2377E+06 |

TABLE 13-continued

Embodiment 5
Aspheric coefficient

| Surface number | S6 | S7 | S8 | S9 | S10 |
|---|---|---|---|---|---|
| K | −9.1595E+00 | −4.4588E+01 | −1.6594E+00 | −8.8039E+01 | −5.3590E+00 |
| A4 | −2.1962E+00 | −1.1489E+00 | 7.2951E−01 | 9.4177E−02 | −2.8217E−01 |
| A6 | 3.0899E+01 | 8.9412E+00 | −7.6843E+00 | −8.6049E−01 | 3.5444E−01 |
| A8 | −3.3955E+02 | −1.5949E+01 | 5.3278E+01 | 2.7782E+00 | −9.6683E−01 |
| A10 | 2.3897E+03 | −5.8989E+01 | −2.4966E+02 | −9.7309E+00 | 1.7990E+00 |
| A12 | −1.1482E+04 | 2.3352E+02 | 8.7064E+02 | 2.1657E+01 | −2.1042E+00 |
| A14 | 3.7331E+04 | 7.2337E+01 | −2.0784E+03 | −2.7911E+01 | 1.5982E+00 |
| A16 | −7.8636E+04 | −1.6468E+03 | 3.1097E+03 | 2.0790E+01 | −7.7301E−01 |
| A18 | 9.6575E+04 | 3.1152E+03 | −2.6034E+03 | −8.3605E+00 | 2.1689E−01 |
| A20 | −5.2032E+04 | −1.9209E+03 | 9.2797E+02 | 1.4077E+00 | −2.6874E−02 |

TABLE 14

| f (mm) | 1.60 | SD11/ImgH | 0.21 |
|---|---|---|---|
| FNO | 2.2 | R1/f1 | 0.77 |
| FOV (°) | 95.5 | f5/f | −0.80 |
| ImgH (mm) | 1.74 | ImgH/TTL | 0.67 |
| TTL (mm) | 2.57 | R5/R6 | 1.22 |
| SD11/SD12 | 0.95 | V2/V1 | 0.37 |
| $|\theta|_{(°)}$ | 2.40 | CT1/OAL | 0.11 |
| SD11/SD52 | 0.29 | tan(FOV/2)/EPD (mm$^{-1}$) | 1.51 |

Figure 10A:
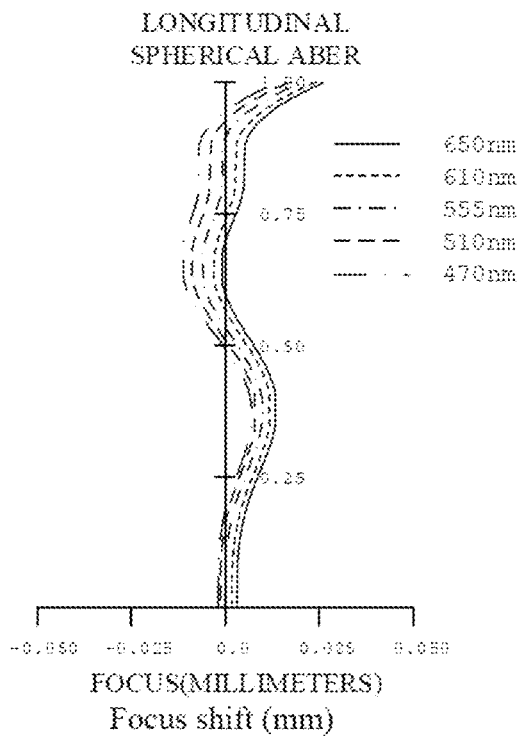
FIG. 10A to FIG. 10C show longitudinal spherical aberration curves, astigmatic field curves and distortion curves of the optical imaging system according to Embodiment 5 respectively.
Figure 10B:
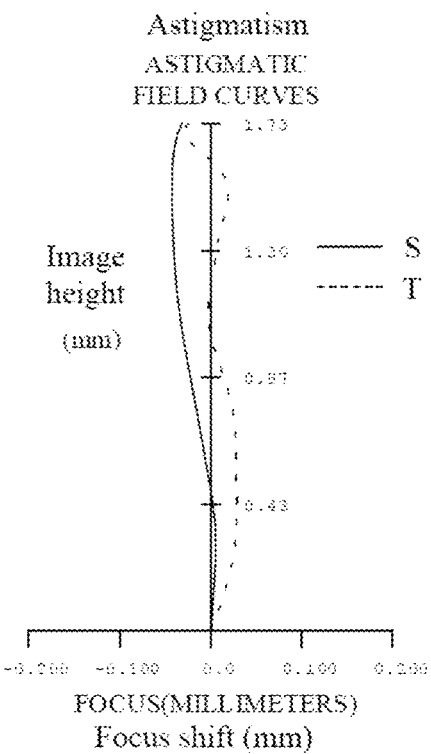
Figure 10C:
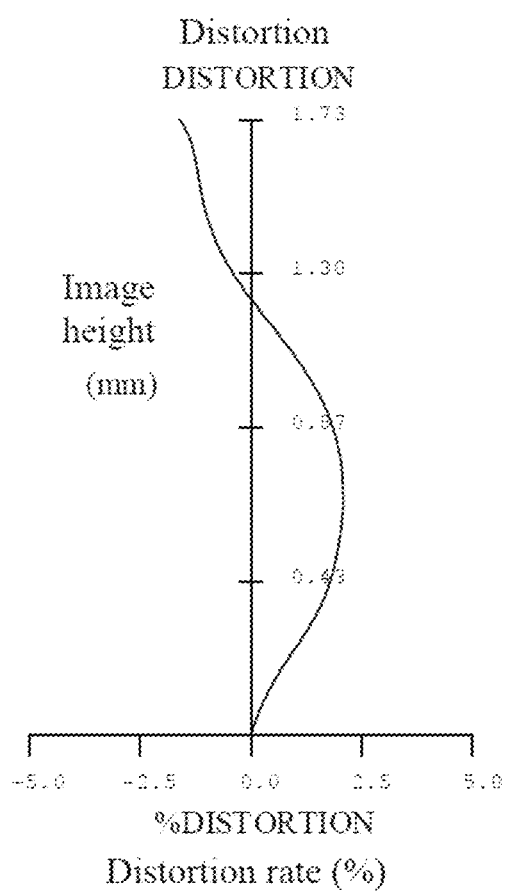

FIG. 10A shows longitudinal spherical aberration curves of the optical imaging system according to Embodiment 5, which respectively indicate focus shift of light with different wavelengths after convergence through the optical imaging system. FIG. 10B shows astigmatic field curves of the optical imaging system according to Embodiment 5, which indicate curvature of a tangential image surface and curvature of a sagittal image surface. FIG. 10C shows distortion curves of the optical imaging system according to Embodiment 5, which indicate distortion rates at different image heights. It may be known from FIG. 10A to FIG. 10C that the optical imaging system according to Embodiment 5 can achieve good imaging quality.

Embodiment 6

Figure 11:
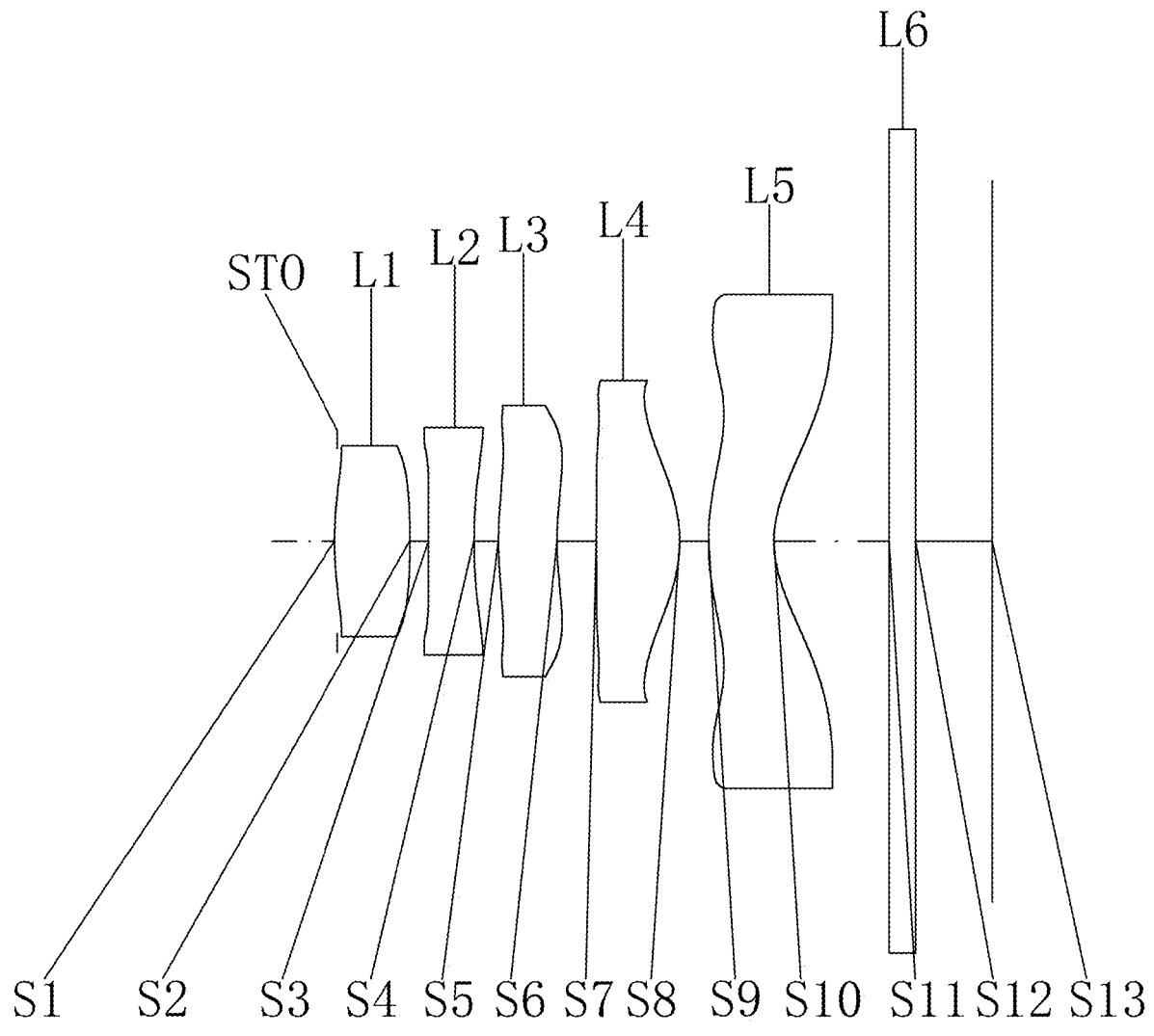
FIG. 11 is a schematic structural diagram of an optical imaging system according to Embodiment 6 of the present disclosure.

An optical imaging system according to Embodiment 6 of the present disclosure is described below with reference to FIG. 11 to FIG. 12C. In this embodiment, for brevity, the description similar to that of Embodiment 1 will be omitted. FIG. 11 is a schematic structural diagram of an optical imaging system according to Embodiment 6 of the present disclosure.

As shown in FIG. 11, the optical imaging system includes a first lens L1, a second lens L2, a third lens L3, a fourth lens L4, a fifth lens L5 and an imaging surface S13 in sequence from an object side to an image side along an optical axis.

The first lens L1 has positive focal power, with an object-side surface S1 and an image-side surface S2 that are aspheric. The object-side surface S1 is convex at the optical axis and convex at the circumference, and the image-side surface S2 is convex at the optical axis and convex at the circumference.

The second lens L2 has negative focal power, with an object-side surface S3 and an image-side surface S4 that are aspheric. The object-side surface S3 is concave at the optical axis and concave at the circumference, and the image-side surface S4 is concave at the optical axis and convex at the circumference.

The third lens L3 has negative focal power, with an object-side surface S5 and an image-side surface S6 that are aspheric. The object-side surface S5 is convex at the optical axis and convex at the circumference, and the image-side surface S6 is concave at the optical axis and convex at the circumference.

The fourth lens L4 has positive focal power, with an object-side surface S7 and an image-side surface S8 that are aspheric. The object-side surface S7 is convex at the optical axis and convex at the circumference, and the image-side surface S8 is convex at the optical axis and concave at the circumference.

The fifth lens L5 has negative focal power, with an object-side surface S9 and an image-side surface S10 that are aspheric. The object-side surface S9 is convex at the optical axis and concave at the circumference, and the image-side surface S10 is concave at the optical axis and convex at the circumference.

A diaphragm is further arranged between an object OBJ and the first lens L1, to further improve the imaging quality of the optical imaging system.

The optical imaging system further includes a filter L6 with an object-side surface S11 and an image-side surface S12. Light from the object OBJ sequentially passes through the surfaces S1 to S12 and is finally imaged on the imaging surface S13. Optionally, the filter L6 is an infrared filter, configured to filter infrared light in external light incident into the optical imaging system to avoid imaging distortion.

Table 15 shows surface types, curvature radii, thicknesses, materials, refractive indexes, Abbe numbers and effective focal lengths of the lenses of the optical imaging system according to Embodiment 6, wherein the curvature radii, the thicknesses, and the effective focal lengths of the lenses are all in millimeters (mm). Table 16 shows higher-order-term coefficients applicable to the aspheric surfaces S1 to S10 of the lenses in Embodiment 6, wherein the aspheric surface types may be defined by the formula (1) provided in Embodiment 1. Table 17 shows values of related parameters of the optical imaging system according to Embodiment 6. A reference wavelength is 555 nm.

TABLE 15

Embodiment 6
f = 1.991 mm, FNO = 2.2, FOV = 80°, TTL = 2.879 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.011 | | | | |
| S1 | First lens | Aspheric | 2.083 | 0.329 | Plastic | 1.553 | 65.820 | 2.689 |
| S2 | | Aspheric | −4.442 | 0.080 | | | | |
| S3 | Second lens | Aspheric | −56.898 | 0.201 | Plastic | 1.677 | 31.640 | −4.754 |
| S4 | | Aspheric | 3.435 | 0.107 | | | | |
| S5 | Third lens | Aspheric | 2.108 | 0.256 | Plastic | 1.543 | 65.170 | −12.995 |
| S6 | | Aspheric | 1.555 | 0.173 | | | | |
| S7 | Fourth lens | Aspheric | 10.816 | 0.364 | Plastic | 1.605 | 61.140 | 1.282 |
| S8 | | Aspheric | −0.828 | 0.126 | | | | |
| S9 | Fifth lens | Aspheric | 1.419 | 0.287 | Plastic | 1.697 | 46.640 | −1.884 |
| S10 | | Aspheric | 0.626 | 0.506 | | | | |
| S11 | Infrared filter | Spherical | Infinity | 0.116 | Glass | 1.517 | 64.167 | |
| S12 | | Spherical | Infinity | 0.336 | | | | |
| S13 | Imaging surface | Spherical | Infinity | 0.000 | | | | |

TABLE 16

Embodiment 6
Aspheric coefficient

| Surface number | S1 | S2 | S3 | S4 | S5 |
|---|---|---|---|---|---|
| K | −6.9635E+00 | 7.5143E+01 | 9.9000E+01 | −5.0609E+01 | −1.2955E+01 |
| A4 | −3.2509E−01 | 7.0727E−02 | 9.6097E−01 | 7.7252E−01 | −9.6523E−01 |
| A6 | 9.6483E+00 | −5.1429E+00 | −2.1984E+01 | −5.7534E+00 | 9.0936E+00 |
| A8 | −3.2515E+02 | 6.3556E+00 | 4.1182E+02 | 2.7535E+01 | −1.0988E+02 |
| A10 | 6.0294E+03 | 1.1898E+02 | −6.5566E+03 | −1.0013E+02 | 8.5553E+02 |
| A12 | −6.9837E+04 | −5.9897E+02 | 6.8464E+04 | −7.6276E+01 | −4.2815E+03 |
| A14 | 5.0764E+05 | −1.3483E+03 | −4.4982E+05 | 3.1713E+03 | 1.3802E+04 |
| A16 | −2.2465E+06 | 2.2744E+04 | 1.7932E+06 | −1.5708E+04 | −2.7950E+04 |
| A18 | 5.5167E+06 | −8.2969E+04 | −3.9578E+06 | 3.3990E+04 | 3.2848E+04 |
| A20 | −5.7518E+06 | 1.0964E+05 | 3.7047E+06 | −2.8319E+04 | −1.7215E+04 |

| Surface number | S6 | S7 | S8 | S9 | S10 |
|---|---|---|---|---|---|
| K | −1.5658E+01 | −8.7253E+01 | −2.3254E+00 | −2.5231E+01 | −4.0019E+00 |
| A4 | −1.6923E+00 | −1.1107E+00 | −6.1622E−02 | 4.7501E−01 | 1.2358E−01 |
| A6 | 1.5886E+01 | 1.0378E+01 | 1.9189E+00 | −2.9709E+00 | −1.7650E+00 |
| A8 | −1.2897E+02 | −3.6218E+01 | 1.7713E−01 | 6.9154E+00 | 4.6000E+00 |
| A10 | 6.7763E+02 | 2.4117E+01 | −1.8048E+01 | −1.3402E+01 | −7.0134E+00 |
| A12 | −2.5158E+03 | 2.5660E+02 | 6.1282E+01 | 2.1985E+01 | 6.9798E+00 |
| A14 | 6.4643E+03 | −1.0777E+03 | −1.3069E+02 | −2.4947E+01 | −4.5503E+00 |
| A16 | −1.0836E+04 | 2.0107E+03 | 1.9080E+02 | 1.7526E+01 | 1.8619E+00 |
| A18 | 1.0588E+04 | −1.8678E+03 | −1.5886E+02 | −6.8581E+00 | −4.3057E−01 |
| A20 | −4.4868E+03 | 6.9662E+02 | 5.4869E+01 | 1.1433E+00 | 4.2509E−02 |

TABLE 17

| | | | |
|---|---|---|---|
| f (mm) | 1.99 | SD11/ImgH | 0.26 |
| FNO | 2.2 | R1/f1 | 0.77 |
| FOV (°) | 80.0 | f5/f | −0.95 |
| ImgH (mm) | 1.74 | ImgH/TTL | 0.60 |
| TTL (mm) | 2.88 | R5/R6 | 1.36 |
| SD11/SD12 | 0.97 | V2/V1 | 0.48 |
| |θ|$_{(°)}$ | 0.30 | CT1/OAL | 0.17 |
| SD11/SD52 | 0.38 | tan(FOV/2)/EPD (mm$^{-1}$) | 0.93 |

Figure 12A:
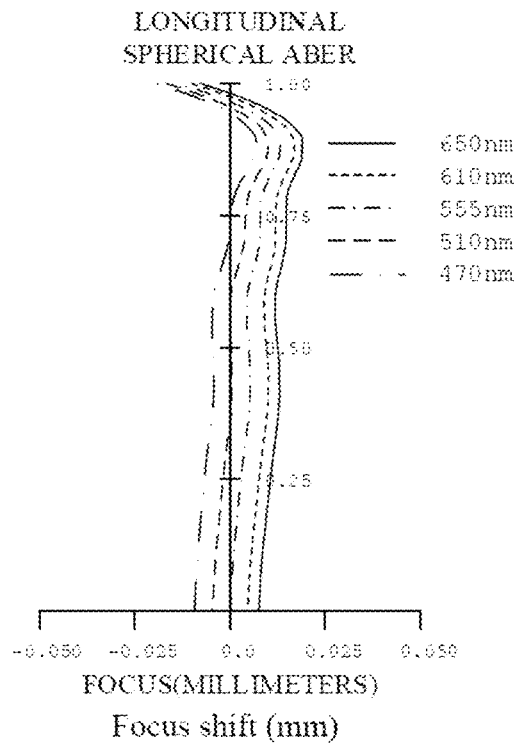
FIG. 12A to FIG. 12C show longitudinal spherical aberration curves, astigmatic field curves and distortion curves of the optical imaging system according to Embodiment 6 respectively.
Figure 12B:
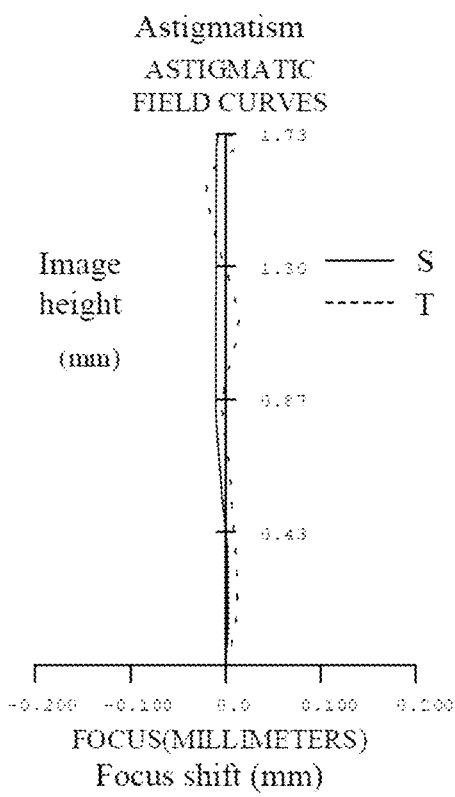
Figure 12C:
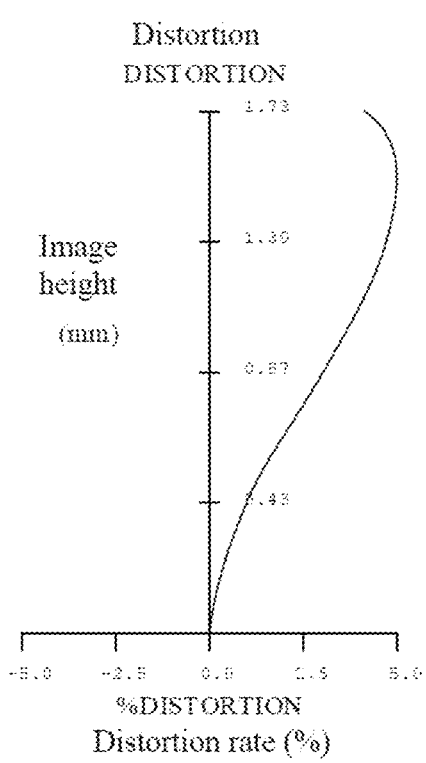

FIG. 12A shows longitudinal spherical aberration curves of the optical imaging system according to Embodiment 6, which respectively indicate focus shift of light with different wavelengths after convergence through the optical imaging system. FIG. 12B shows astigmatic field curves of the optical imaging system according to Embodiment 6, which indicate curvature of a tangential image surface and curvature of a sagittal image surface. FIG. 12C shows distortion curves of the optical imaging system according to Embodiment 6, which indicate distortion rates at different image heights. It may be known from FIG. 12A to FIG. 12C that the optical imaging system according to Embodiment 6 can achieve good imaging quality.

The present disclosure further provides an image capturing apparatus, including the optical imaging system as described above; and a photosensitive element arranged on the image side of the optical imaging system to receive light carrying image information formed by the optical imaging system. Specifically, the photosensitive element may be a complementary metal oxide semiconductor (CMOS) image sensor or a charge-coupled device (CCD) image sensor.

The image capturing apparatus can obtain wide-angle images with small aberration and high resolution by using the optical imaging system described above. At the same time, the image capturing apparatus is also miniaturized for easy adaptation to apparatuses with a limited size, such as slim electronic devices.

The present disclosure further provides an electronic apparatus, including a housing and the image capturing apparatus described above. The image capturing apparatus is mounted to the housing to acquire an image.

Specifically, the image capturing apparatus is arranged in the housing and is exposed from the housing to acquire an image. The housing can provide dustproof, waterproof and shatter-resistant protection for the image capturing apparatus. The housing is provided with a hole corresponding to the image capturing apparatus, to allow light to penetrate into or out of the housing through the hole.

The electronic apparatus features a slim structure. Images with a wide angle and good imaging quality can be obtained by using the image capturing apparatus described above, so as to meet the photographing requirements of cameras for such devices as mobile phones, vehicle-mounted devices, surveillance devices and medical devices.

The "electronic apparatus" used in the embodiments of the present disclosure includes, but is not limited to, an apparatus that is configured to receive/transmit communication signals via a wireline connection (such as via a public-switched telephone network (PSTN), a digital subscriber line (DSL), a digital cable, a direct cable connection, and/or another data connection/network), and/or via a wireless interface (for example, a cellular network, a wireless local area network (WLAN), a digital television network such as a digital video broadcasting handheld (DVB-H) network, a satellite network, an AM/FM broadcast transmitter, and/or another communication terminal). An electronic apparatus that is configured to communicate over a wireless interface may be referred to as a "wireless communication terminal," a "wireless terminal" and/or a "mobile terminal." Examples of mobile terminals include, but are not limited to, a satellite or cellular phone; a personal communications system (PCS) terminal that may combine a cellular radiotelephone with data processing, facsimile and data communications capabilities; a personal digital assistant (PDA) that can include a radiotelephone, a pager, an Internet/intranet access, a Web browser, an organizer, a calendar and/or a global positioning system (GPS) receiver; and a conventional laptop and/or palmtop receiver or other electronic apparatuses that include a radiotelephone transceiver.

Technical features of the above embodiments may be combined randomly. To make descriptions brief, not all possible combinations of the technical features in the embodiments are described. Therefore, as long as there is no contradiction between the combinations of the technical features, they should all be considered as scopes disclosed in the specification.

The above embodiments only describe several implementations of the present disclosure, which are described specifically and in detail, and therefore cannot be construed as a limitation on the patent scope. It should be pointed out that those of ordinary skill in the art may also make several changes and improvements without departing from the ideas of the present disclosure, all of which fall within the protection scope of the present disclosure. Therefore, the patent protection scope of the present disclosure shall be subject to the appended claims.

The invention claimed is:

1. An optical imaging system, comprising a first lens, a second lens, a third lens, a fourth lens and a fifth lens in sequence from an object side to an image side along an optical axis, wherein
the first lens has positive focal power, with an object-side surface being convex at the optical axis;
the second lens has focal power, with an image-side surface being concave convex at the optical axis;
the third lens has focal power;
the fourth lens has positive focal power, with an image-side surface being convex at the optical axis;
the fifth lens has negative focal power, with an object-side surface being convex at the optical axis and an image-side surface being concave at the optical axis, at least one of the object-side surface and the image-side surface of the fifth lens comprising at least one inflection point;
a diaphragm is arranged between the object side of the optical imaging system and the fifth lens; and
the optical imaging system satisfies the following relations:

$$SD11/SD12<1.1; \text{ and}$$

$$80°≤FOV≤120°;$$

where SD11 is a maximum effective semi-diameter of the object-side surface of the first lens, SD12 is a maximum effective semi-diameter of an image-side surface of the first lens, and FOV is a maximum field-of-view angle of the optical imaging system, $$|θ|<20°;$$

where θ is an angle between a tangent line of a vertex of a maximum effective diameter of the object-side surface of the first lens and a normal of the optical axis.

2. The optical imaging system according to claim 1, wherein the diaphragm is arranged between the object side of the optical imaging system and the first lens.

3. The optical imaging system according to claim 1, wherein the optical imaging system satisfies the following relation:

$$SD11/SD52<0.4;$$

where SD11 is a maximum effective semi-diameter of the object-side surface of the first lens, and SD52 is a maximum effective semi-diameter of the image-side surface of the fifth lens.

4. An optical imaging system, comprising a first lens, a second lens, a third lens, a fourth lens and a fifth lens in sequence from an object side to an image side along an optical axis, wherein
the first lens has positive focal power, with an object-side surface being convex at the optical axis;
the second lens has focal power, with an image-side surface being concave at the optical axis;
the third lens has focal power;
the fourth lens has positive focal power, with an image-side surface being convex at the optical axis;
the fifth lens has negative focal power, with an object-side surface being convex at the optical axis and an image-side surface being concave at the optical axis, at least one of the object-side surface and the image-side surface of the fifth lens comprising at least one inflection point;
a diaphragm is arranged between the object side of the optical imaging system and the fifth lens; and
the optical imaging system satisfies the following relations:

$$SD11/SD12<1.1; \text{ and}$$

$$80°≤FOV≤120°;$$

where SD11 is a maximum effective semi-diameter of the object-side surface of the first lens, SD12 is a maximum effective semi-diameter of an image-side surface of the first lens, and FOV is a maximum field-of-view angle of the optical imaging system;

$SD11/ImgH \leq 0.27$;

where SD11 is a maximum effective semi-diameter of the object-side surface of the first lens, and ImgH is half of a diagonal length of an effective pixel region on an imaging surface of the optical imaging system.

5. The optical imaging system according to claim 1, wherein the optical imaging system satisfies the following relation:

$0.3 < R1/f1 < 0.8$;

where R1 is a curvature radius of the object-side surface of the first lens at the optical axis, and f1 is an effective focal length of the first lens.

6. The optical imaging system according to claim 1, wherein the optical imaging system satisfies the following relation:

$f5/f < -0.5$;

where f5 is an effective focal length of the fifth lens, and f is an effective focal length of the optical imaging system.

7. The optical imaging system according to claim 1, wherein the optical imaging system satisfies the following relation:

$ImgH/TTL \geq 0.6$;

where ImgH is half of a diagonal length of an effective pixel region on an imaging surface of the optical imaging system, and TTL is a distance on the optical axis from the object-side surface of the first lens to the imaging surface of the optical imaging system.

8. The optical imaging system according to claim 1, wherein the optical imaging system satisfies the following relation:

$0.3 < V2/V1 \leq 1$;

where V1 is a dispersion coefficient of the first lens, and V2 is a dispersion coefficient of the second lens.

9. The optical imaging system according to claim 1, wherein the optical imaging system satisfies the following relation:

$CT1/OAL < 0.21$;

where CT1 is a thickness of the first lens on the optical axis, and OAL is a distance on the optical axis from the object-side surface of the first lens to the image-side surface of the fifth lens.

10. An image capturing apparatus, comprising the optical imaging system according to claim 1; and a photosensitive element, the photosensitive element being arranged on the image side of the optical imaging system.

11. An electronic apparatus, comprising: a housing; and the image capturing apparatus according to claim 10, the image capturing apparatus being mounted to the housing.

12. An optical imaging system, comprising a first lens, a second lens, a third lens, a fourth lens and a fifth lens in sequence from an object side to an image side along an optical axis, wherein the first lens has positive focal power, with an object-side surface being convex at the optical axis;

the second lens has focal power, with an image-side surface being concave at the optical axis;

the third lens has focal power;

the fourth lens has positive focal power, with an image-side surface being convex at the optical axis;

the fifth lens has negative focal power, with an object-side surface being convex at the optical axis and an image-side surface being concave at the optical axis, at least one of the object-side surface and the image-side surface of the fifth lens comprising at least one inflection point;

a diaphragm is arranged between the object side of the optical imaging system and the fifth lens; and the optical imaging system satisfies the following relations:

$SD11/SD12 < 1.1$; and $95.5° \leq FOV \leq 120°$;

where SD11 is a maximum effective semi-diameter of the object-side surface of the first lens, SD12 is a maximum effective semi-diameter of an image-side surface of the first lens, and FOV is a maximum field-of-view angle of the optical imaging system;

$SD11/SD52 < 0.4$;

where SD11 is a maximum effective semi-diameter of the object-side surface of the first lens, and SD52 is a maximum effective semi-diameter of the image-side surface of the fifth lens.

13. The optical imaging system according to claim 12, wherein the diaphragm is arranged between the object side of the optical imaging system and the first lens.

14. The optical imaging system according to claim 12, wherein the optical imaging system satisfies the following relation:

$|\theta| < 20°$;

where θ is an angle between a tangent line of a vertex of a maximum effective diameter of the object-side surface of the first lens and a normal of the optical axis.

15. The optical imaging system according to claim 12, wherein the optical imaging system satisfies the following relation:

$SD11/ImgH \leq 0.27$;

where SD11 is a maximum effective semi-diameter of the object-side surface of the first lens, and ImgH is half of a diagonal length of an effective pixel region on an imaging surface of the optical imaging system.

16. The optical imaging system according to claim 12, wherein the optical imaging system satisfies the following relation:

$0.3 < R1/f1 < 0.8$;

where R1 is a curvature radius of the object-side surface of the first lens at the optical axis, and f1 is an effective focal length of the first lens.

17. The optical imaging system according to claim 12, wherein the optical imaging system satisfies the following relation:

$f5/f < -0.5$;

where f5 is an effective focal length of the fifth lens, and f is an effective focal length of the optical imaging system.

* * * * *